(12) United States Patent
Habel et al.

(10) Patent No.: US 10,232,481 B2
(45) Date of Patent: Mar. 19, 2019

(54) WORKPIECE HOLDING FIXTURE FOR MACHINING MULTIPLE PRISMATIC PARTS

(71) Applicant: Ford Global Technologies, LLC, Dearborn, MI (US)

(72) Inventors: Michael Joseph Habel, Ann Arbor, MI (US); Richard S. Stanifer, Springboro, MI (US); Kenneth W. Manes, Saline, MI (US); John Wayne Menard, Windsor (CA); Matthew Gerald DuFresne, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 15/091,051

(22) Filed: Apr. 5, 2016

(65) Prior Publication Data
US 2017/0282319 A1    Oct. 5, 2017

(51) Int. Cl.
*B23Q 3/06* (2006.01)
*B23Q 17/00* (2006.01)

(52) U.S. Cl.
CPC ............ *B23Q 17/003* (2013.01); *B23Q 3/06* (2013.01)

(58) Field of Classification Search
CPC .......... B23Q 1/621; B23Q 17/22; B23Q 3/06; B23Q 3/069; G05B 19/4155
See application file for complete search history.

(56) References Cited

U.S. PATENT DOCUMENTS

| | | | |
|---|---|---|---|
| 3,174,746 A | 3/1965 | Bean | |
| 3,436,071 A | 4/1969 | Petruccelli | |
| 3,801,090 A * | 4/1974 | Gillen | B23Q 1/621 248/913 |
| 4,778,313 A * | 10/1988 | Lehmkuhl | B23B 29/03457 29/56.5 |
| 4,821,408 A | 4/1989 | Speller, Sr. et al. | |
| 4,937,948 A * | 7/1990 | Herzog | G01B 5/012 33/556 |
| 5,109,610 A * | 5/1992 | Johnson | G01B 7/004 33/503 |

(Continued)

FOREIGN PATENT DOCUMENTS

CN    201596907 U    10/2010

OTHER PUBLICATIONS

M.N. Sela et al., "A Reconfigurable Modular Fixturing System for Thin-Walled Flexible Objects," Department of Mechanical and Industrial Engineering, University of Toronto, Oct. 1996, 19 pages.

(Continued)

*Primary Examiner* — Tyrone V Hall, Jr.
(74) *Attorney, Agent, or Firm* — Raymond Coppiellie; Price Heneveld LLP

(57) ABSTRACT

A workpiece fixture assembly is provided herein. The workpiece fixture assembly includes a baseplate including an engagement surface. First and second static risers are configured to maintain a position of a workpiece. The first static riser includes a first gage bore thereon. A dynamic riser is configured to abut the workpiece and has a second gage bore thereon. A numerical control machine has a probe to measure an offset distance between the first and second gage bores. A linearly actuable workpiece support is disposed on the baseplate.

18 Claims, 31 Drawing Sheets

(56) References Cited

U.S. PATENT DOCUMENTS

| | | | | |
|---|---|---|---|---|
| 5,352,249 | A | * | 10/1994 | Vollaro .................. H01L 21/68 |
| | | | | 269/305 |
| 5,771,553 | A | | 6/1998 | Sim et al. |
| 6,644,637 | B1 | * | 11/2003 | Shen ....................... B25B 5/061 |
| | | | | 269/152 |
| 7,422,202 | B2 | * | 9/2008 | Wu ........................ G02B 27/62 |
| | | | | 269/291 |
| 7,971,863 | B2 | * | 7/2011 | Chen ........................ B25B 5/06 |
| | | | | 269/289 R |
| 8,025,277 | B2 | | 9/2011 | Lin et al. |
| 8,985,564 | B2 | | 3/2015 | Stanifer et al. |
| 9,741,597 | B2 | * | 8/2017 | Jiang ................ H01L 21/67796 |
| 2003/0034602 | A1 | * | 2/2003 | Kavanaugh ............. B25B 11/00 |
| | | | | 269/45 |
| 2010/0140860 | A1 | | 6/2010 | Gao et al. |
| 2013/0334753 | A1 | * | 12/2013 | Stanifer ................. B23Q 3/069 |
| | | | | 269/32 |

OTHER PUBLICATIONS

S. Arzanpour et al., "Flexible Fixture Design with Applications to Assembly of Sheet Metal Automotive Body Parts," Assembly Automation, vol. 26, No. 2, Published Apr. 1, 2006, 1 page.

* cited by examiner

WORKPIECE HOLDING FIXTURE FOR MACHINING MULTIPLE PRISMATIC PARTS

FIELD OF THE INVENTION

The present invention generally relates to a fixture that is designed for use with multiple prismatic parts, and more specifically, to a fixture that includes at least one movable riser/locating pad/clamp assembly for rapid transitioning between different parts or workpiece types, eliminating the requirement of exchanging the fixture or fixture components.

BACKGROUND OF THE INVENTION

Fixtures are used in manufacturing practices to process workpieces. The fixtures must be stable and robust and be able to securely hold a workpiece in place as the workpiece is processed.

SUMMARY OF THE INVENTION

According to one aspect of the present invention, a workpiece fixture assembly is disclosed. The workpiece fixture assembly includes a baseplate including an engagement surface. First and second static risers include a position control member and are configured to removably couple a first workpiece thereto. The first static riser includes a first gage bore thereon. A dynamic riser is configured to abut the workpiece and has a second gage bore thereon. A numerical control machine has a probe to measure an offset distance between the first and second gage bores.

According to another aspect of the present invention, a workpiece fixture assembly is disclosed. The workpiece fixture assembly includes a baseplate including an engagement surface. First and second static risers are configured to maintain a position of a workpiece. The first static riser includes a first gage bore thereon. A dynamic riser is configured to abut the workpiece having a second gage bore thereon. A numerical control machine has a probe to measure an offset distance between the first and second gage bores. A linearly actuable workpiece support is disposed on the baseplate.

According to yet another aspect of the present invention, a workpiece fixture assembly is disclosed. The workpiece fixture assembly includes first and second static risers coupled to a baseplate. A dynamic riser is configured to move through a plurality of positions along the baseplate. The dynamic riser is based in a desired location based on an offset distance between the first static riser and the dynamic riser. A linearly actuable workpiece support is disposed on the baseplate and includes an actuable first member and a stationary second member.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
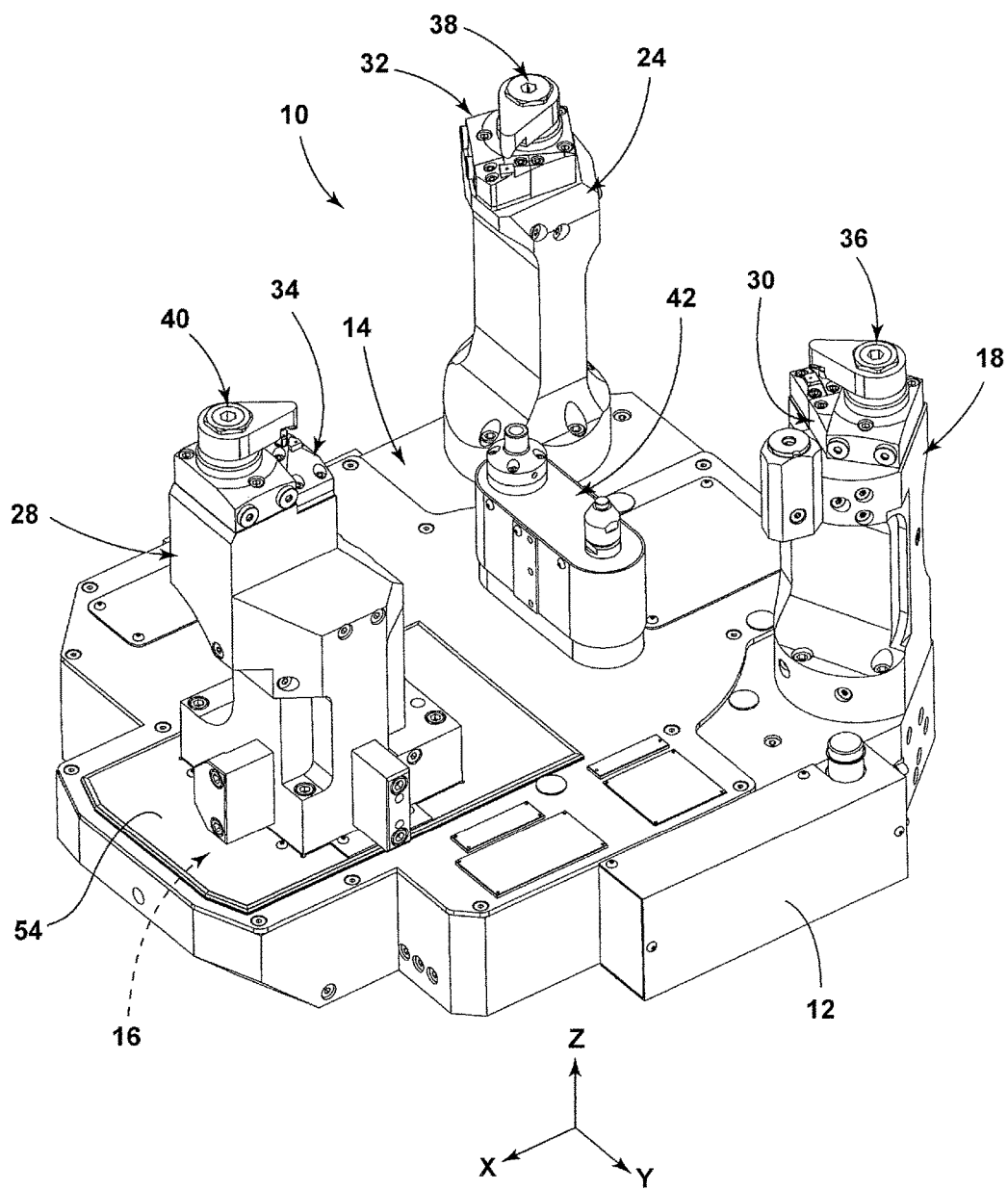
FIG. 1 is a top perspective view of one embodiment of a workpiece holding fixture.
Figure 2:
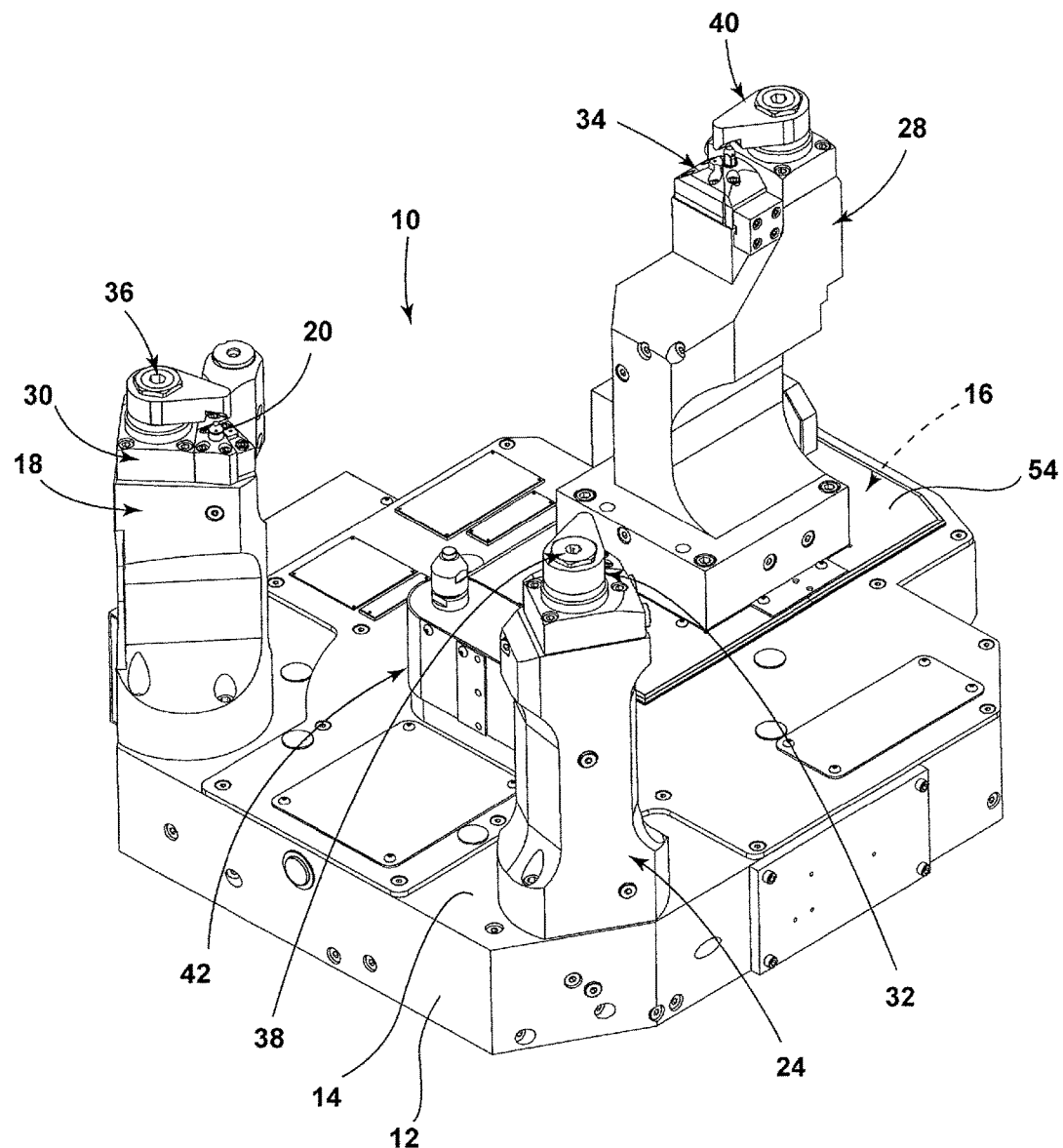
FIG. 2 is an alternate top perspective view of one embodiment of the workpiece holding fixture having a first and second static risers and a dynamic riser.
Figure 3:
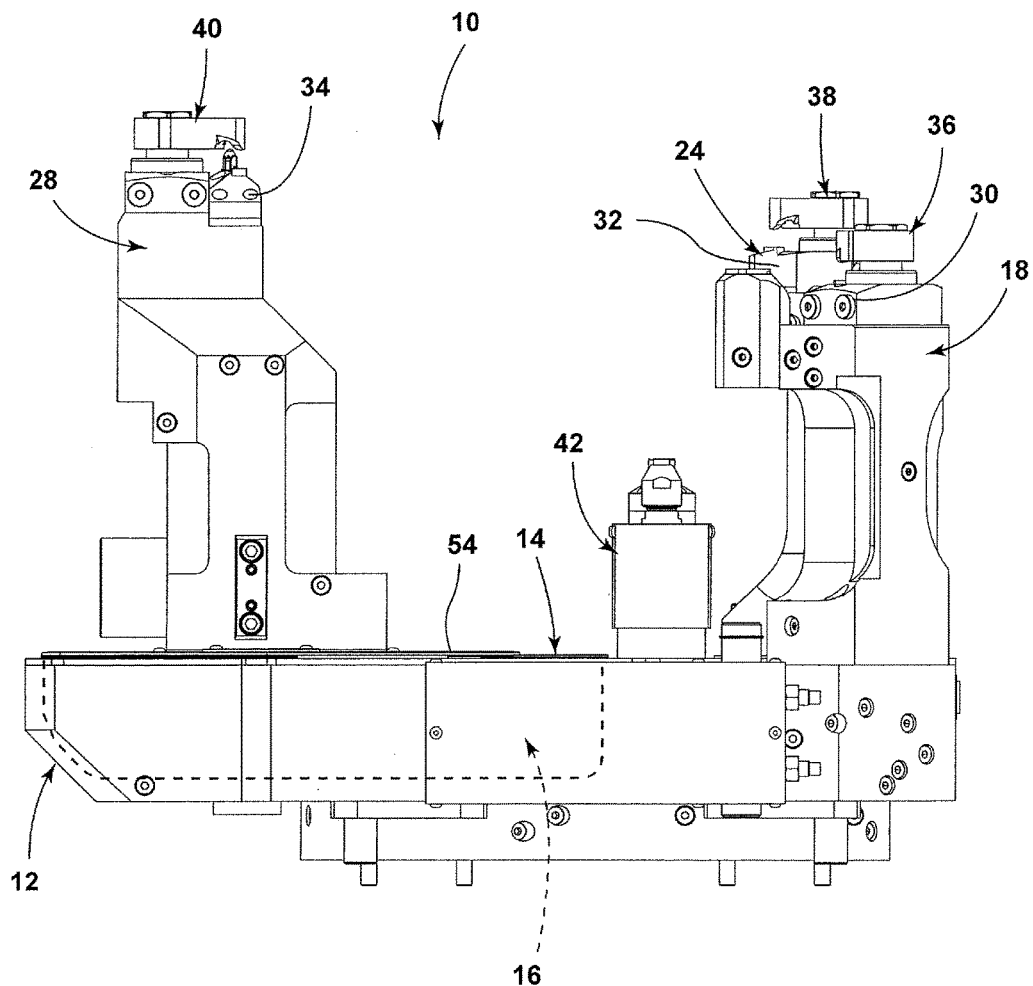
FIG. 3 is a side elevational view of one embodiment of the workpiece holding fixture having a travel slot for moving the dynamic riser.
Figure 4:
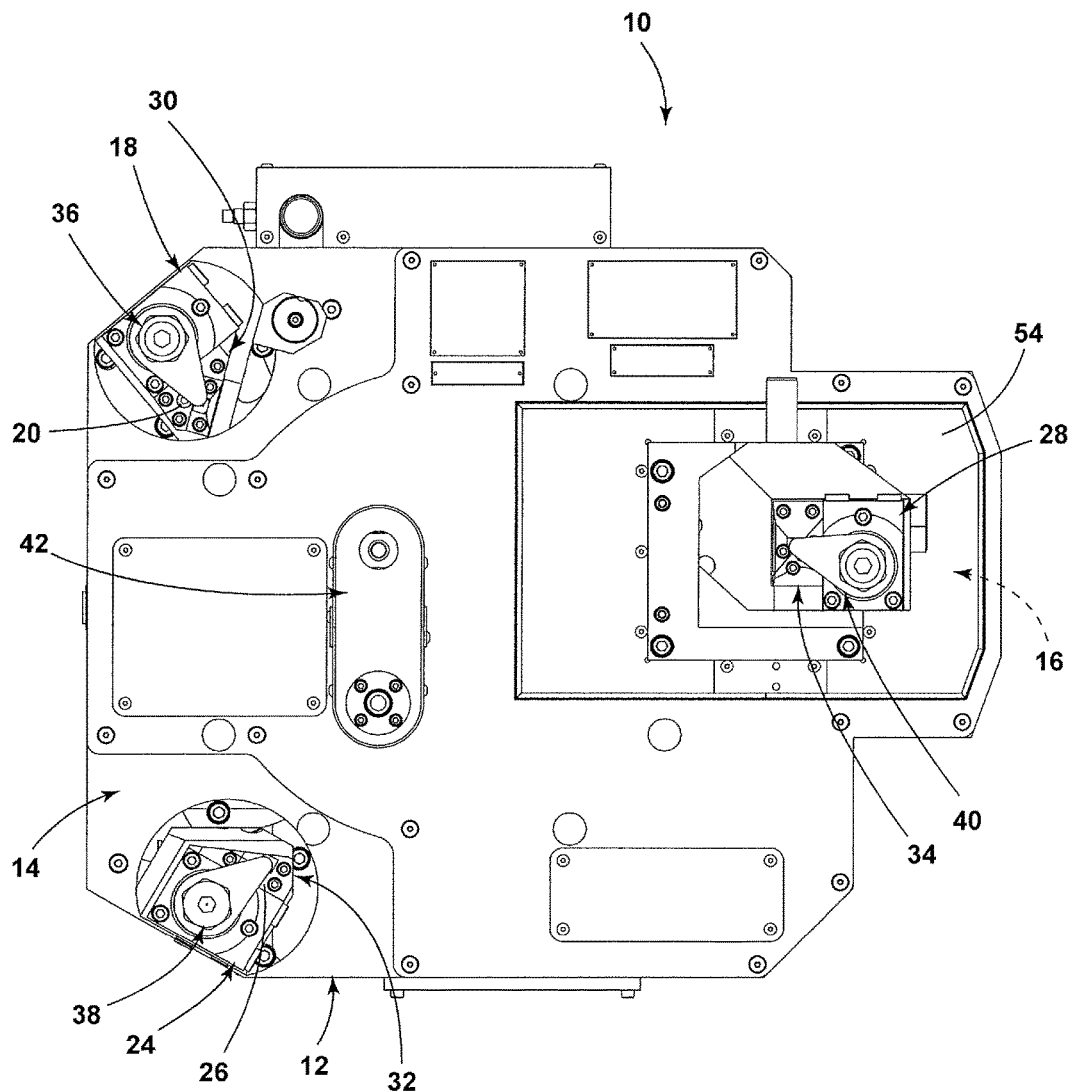
FIG. 4 is a top plan view of one embodiment of the workpiece holding fixture.
Figure 5:
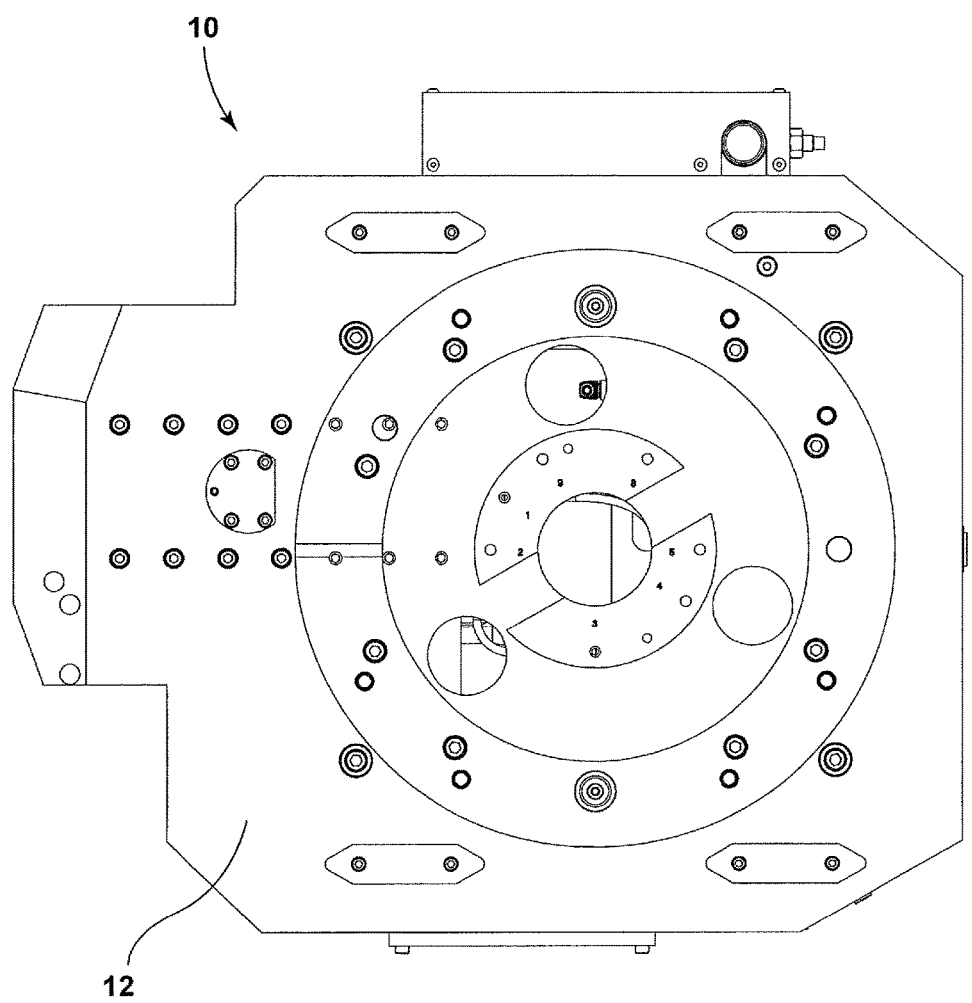
FIG. 5 is a bottom plan view of one embodiment of the workpiece holding fixture having a standardized base portion.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-30, reference numeral 10 generally designates a workpiece holding fixture that includes a baseplate 12 having an engagement surface 14 with a travel slot 16, which may be concealed by a travel slot cover 54. A first static riser 18 includes a positional control member, such as an engagement pin 20, configured to removably couple a workpiece 22 to the first static riser 18. A second static riser 24 includes an engagement pin 26 and is configured to removably couple the workpiece 22 to the second static riser 24. A dynamic riser 28 is slidably coupled with the travel slot 16 and is operable between a plurality of positions associated with various workpieces 22.

According to one embodiment, a CNC machine 56 includes a machine unit 58 and the tool changer 60. The machine unit 58 may include a machine body 68, a spindle 62 arranged on the machine unit 58 for linear articulation, a saddle 64 coupled with the machine body 68, and a worktable 66 that is able to support the workpiece 22. The spindle 62 is configured to couple with one or more dynamic riser 28 moving tools 44, 46 to automatically move the dynamic riser 28 through one or more positions along the travel slot 16.

Referring to FIGS. 1-10, the first and second static risers 18, 24 of the workpiece holding fixture 10 are fixedly connected to the engagement surface 14 of the baseplate 12. The first and second static risers 18, 24 are designed to be removed only after mechanical fasteners or other mechanical features that secure the first and second risers 18, 24 to the baseplate 12 are removed. Generally, according to one embodiment, if the first and second static risers 18, 24 need to be relocated for engagement with a different workpiece 22, the baseplate 12 is removed. Each of the first and second static risers 18, 24 includes a retention member configured to minimize or eliminate movement of the workpiece 22 relative to the first and second static risers 18, 24, thus providing a workpiece 22 that is securely engaged thereby minimizing shifting, vibrating, or wobbling during processing.

As noted above, the engagement pin 20 of the first static riser 18 may include a cylindrical construction, which is configured for engagement with a support pad 30 of the first static riser 18. The cylindrical engagement pin 20 is configured to engage a first tab disposed on the workpiece 22. The first tab may include an aperture adapted to closely receive the cylindrical engagement pin 20 with a very tight tolerance, which, according to one embodiment, may be in range of ±13 microns. The first tab may be formed as a portion of the workpiece 22, or may be a removable part that is used only during the processing of the workpiece 22. The first tab may be constructed from a variety of materials, such as aluminum or steel. In alternate embodiments, any other contact member, instead of or in conjunction with an engagement pin 20, 26, may be utilized for locating the workpiece 22 on the one or more risers 18, 24, 28 without departing from the teachings provided herein.

The second static riser 24 includes the engagement pin 26 and a support pad 32. According to one embodiment, the engagement pin 26 may have a diamond-shaped cross-section. The second tab of the workpiece 22 includes an aperture for receiving the engagement pin 26. Likewise, the dynamic riser 28 includes a support pad 34.

During installation of a workpiece 22 onto the workpiece holding fixture 10, the aperture of the first tab of the workpiece 22 engages the engagement pin 20 of the first static riser 18. Simultaneously, the aperture of the second tab of the workpiece 22 engages the engagement pin 26 of the second static riser 24. The workpiece 22 is smoothly transitioned into position onto the workpiece holding fixture 10, such that the first, second, and third tabs engage the first, second, and third support pads 30, 32, 34, simultaneously, or in rapid succession.

Accordingly, the workpiece 22 is held in place in the x and z directions (via the cylindrical engagement pin 20 of the first static riser 18), as well as rotationally (via the engagement pin 26). Stated differently, the cylindrical engagement pin 20 holds the workpiece 22 in place laterally along a plane parallel with the engagement surface 14 of the baseplate 12. At the same time, the engagement pin 26 limits rotation of the workpiece 22. Once the support pads 30, 32 of the first and second static risers 18, 24 are in abutment with the workpiece 22, securing clamps 36, 38 on the first and second static risers 18, 24 clamp down into secure engagement with the first and second tabs, respectively. At the same time, a securing clamp 40 on the dynamic riser 28 locks down the workpiece 22 to the support tab 34. The workpiece 22 is now in secure engagement with each of the first and second static risers 18, 24, as well as the dynamic riser 28. The workpiece holding fixture 10 now has secure control of the workpiece 22 so that the workpiece 22 can be further processed, machined, or finished. Once the workpiece 22 has been processed, machined, or finished, the securing clamps 36, 38, 40 can be unclamped to allow removal of the workpiece 22 from the workpiece holding fixture 10. In the illustrated embodiment, the securing clamps 36, 38, 40 are vertically extendable and rotatable. However, it is also contemplated that any other securing devices can be used to hold the workpiece 22.

After the initial workpiece 22 has been removed from the workpiece holding fixture 10, the dynamic riser 28 can then be moved automatically, semi-automatically, or manually, into position for engagement with a new workpiece 22 to be processed. The dynamic riser 28 is moved until the third tab of the new workpiece 22 is aligned to abut the support pad 34 of the dynamic riser 28. The securing clamp 40 on the dynamic riser 28 locks down the new workpiece 22 to the support pad 34. The new workpiece 22 is now in secure engagement with each of the first and second static risers 18, 24, as well as the dynamic riser 28. The workpiece holding fixture 10 now has secure control of the new workpiece 22 so that the workpiece 22 can be further processed, machined, or finished.

It is generally contemplated that the workpiece holding fixture 10 can move the dynamic riser 28 by utilizing an automatic system, a semi-automatic system, or a manual system, as generally outlined herein. In one embodiment, the dynamic riser 28 of the workpiece holding fixture 10 moves automatically based upon user-supplied input that directs a computer numerical control (CNC) 56 to move the dynamic riser 28 to move into position to engage a particular workpiece 22, as will be described in greater detail below.

In another embodiment, the dynamic riser 28 is semi-automatically adjusted on the workpiece holding fixture 10. More specifically, a user provides instructions via the CNC machine 56 to utilize a machine tool 44, 46 (FIGS. 13A-13B) to move the dynamic riser 28 to a predetermined location for proper engagement with a particular workpiece 22. In this instance, a user would likely determine which new workpiece 22 is going to be processed and enters instructions into a computerized system to move the dynamic riser 28 to the proper location.

Yet another embodiment includes manual movement of the dynamic riser 28 on the workpiece holding fixture 10. In this instance, the dynamic riser 28 is moved by a user to a position correlating with a particular workpiece 22 through manual manipulation of the machine tool 44, 46 for movement of the dynamic riser 28. For each of the aforementioned systems, it is generally contemplated that the dynamic 28 will be moved into position prior to placement of the workpiece 22 into secure engagement with each of the first and second static risers 18, 24, as well as the dynamic riser 28. However, it is also contemplated that the workpiece 22 may be placed in position against the first and second static risers 18, 24 prior to movement of the dynamic riser 28 into abutting engagement with the workpiece 22.

Figure 6:
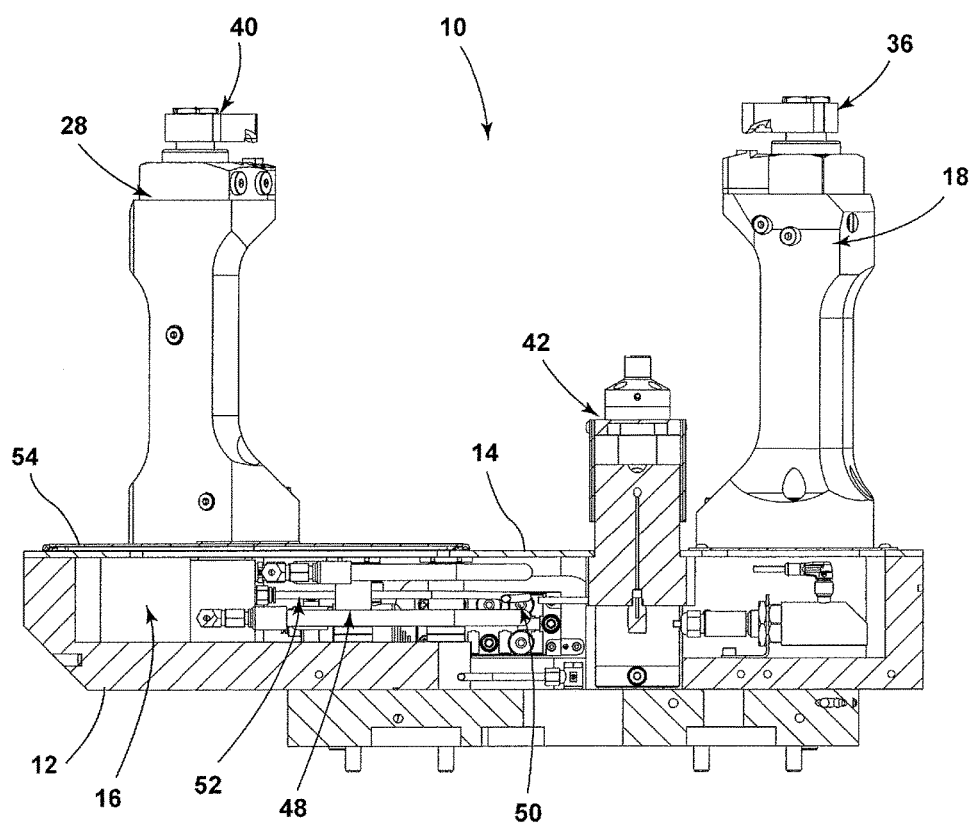
FIG. 6 is a side elevational view of one embodiment of the workpiece holding fixture having an adjustment assembly for moving a dynamic riser.
Figure 7:
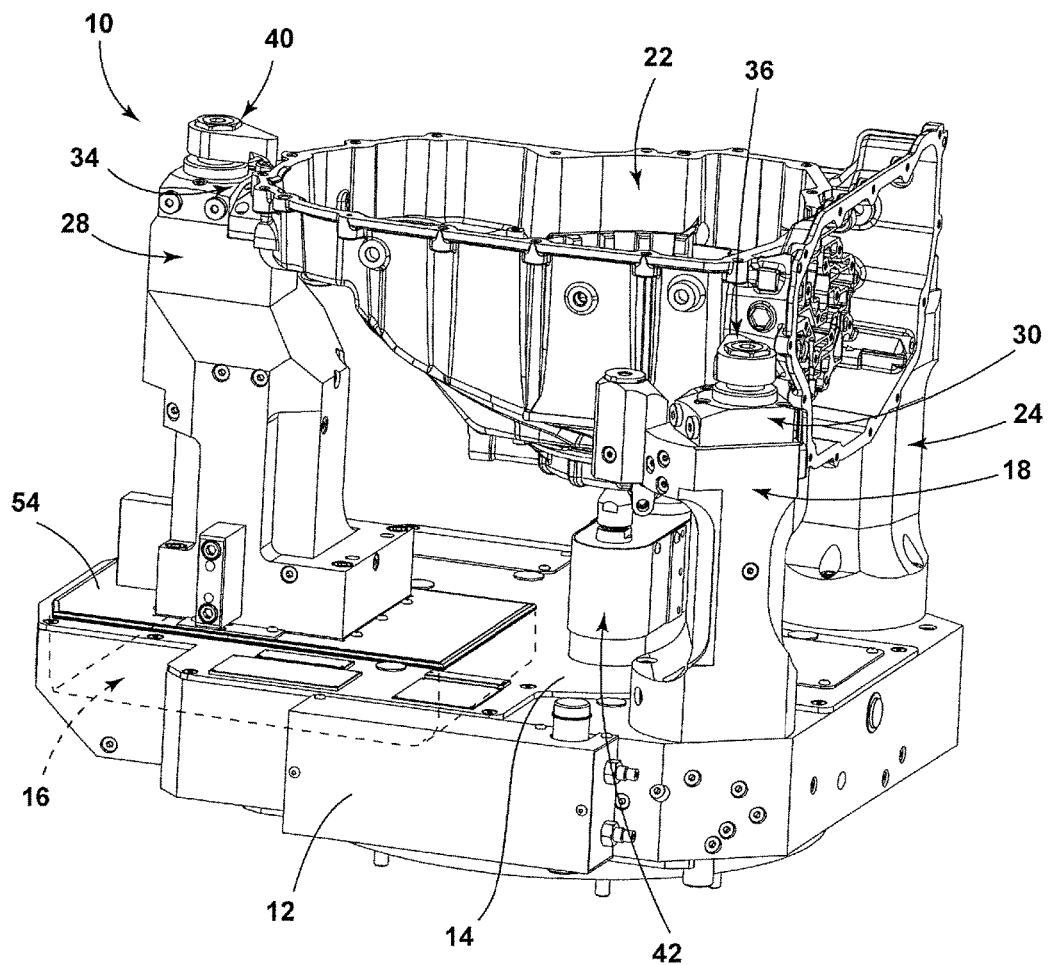
FIG. 7 is a side perspective view of one embodiment of the workpiece holding fixture having a workpiece disposed on the static and dynamic risers.
Figure 8:
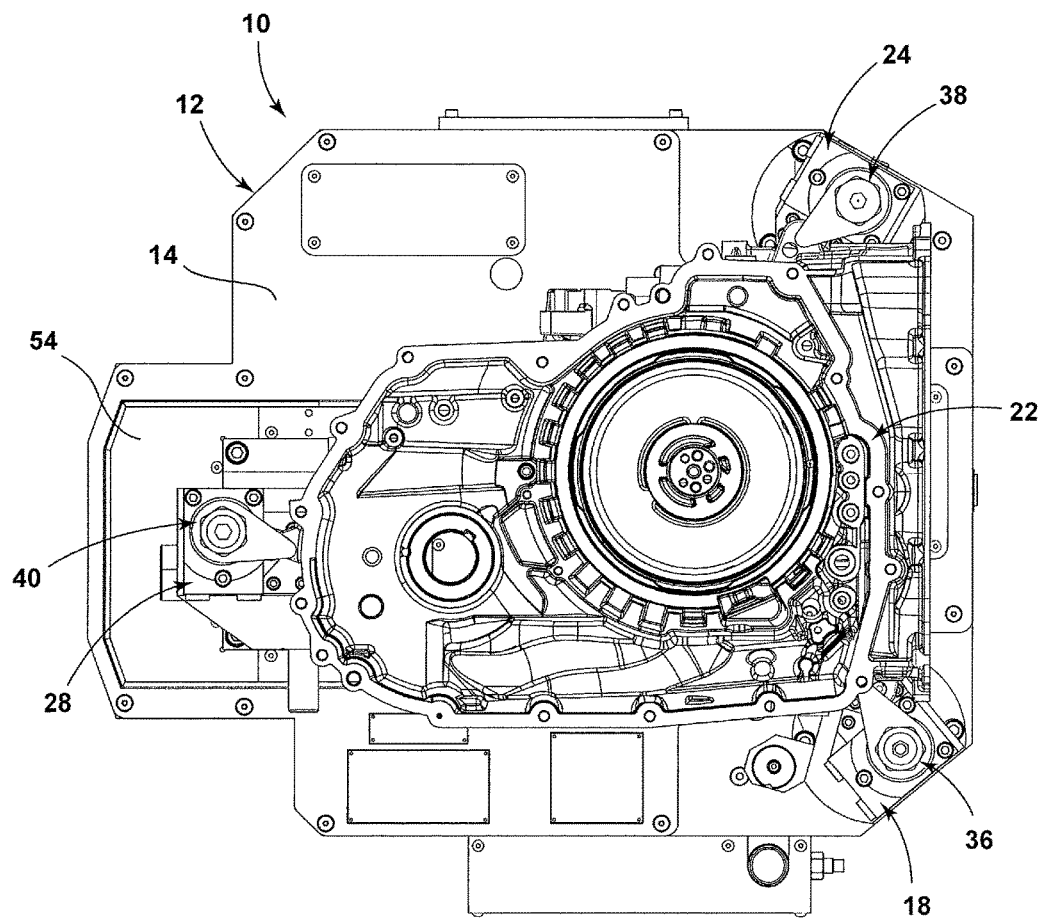
FIG. 8 is a top perspective view of one embodiment of the workpiece holding fixture having the workpiece disposed on the static and dynamic risers.
Figure 9:
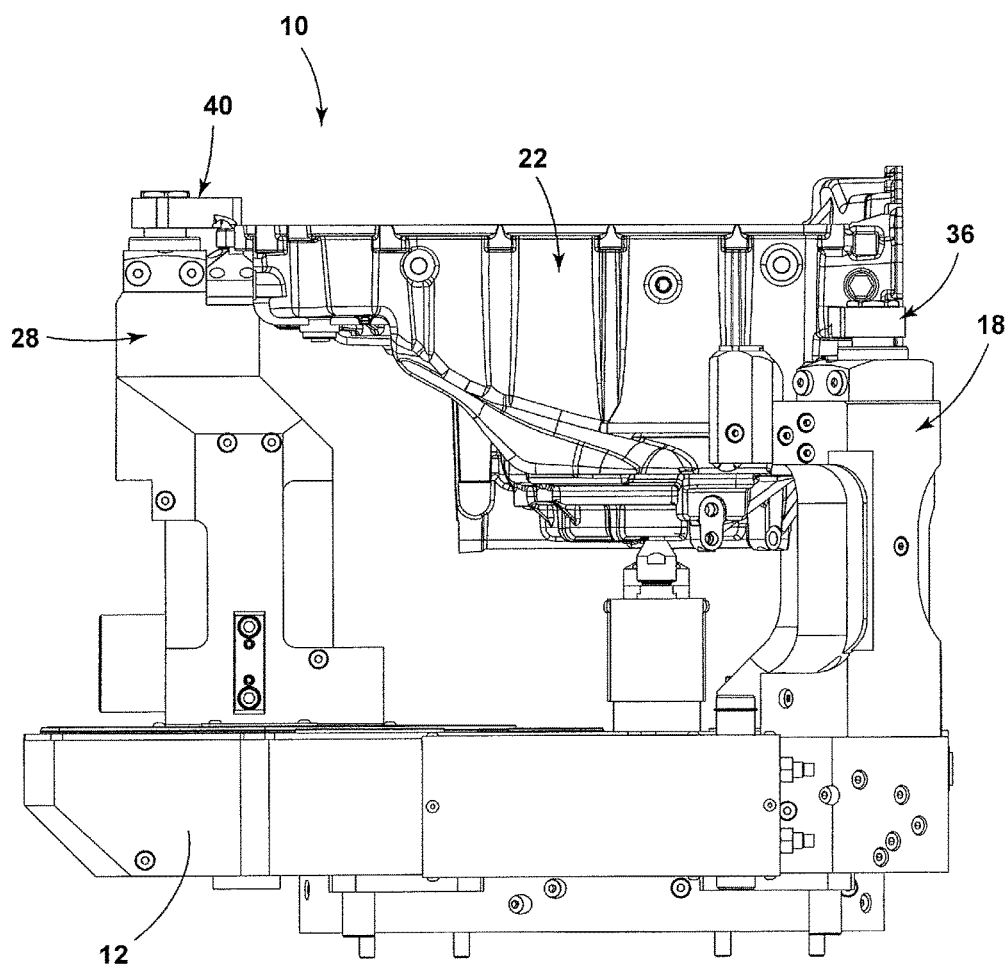
FIG. 9 is a first side elevational view of the workpiece holding fixture of FIG. 7.
Figure 10:
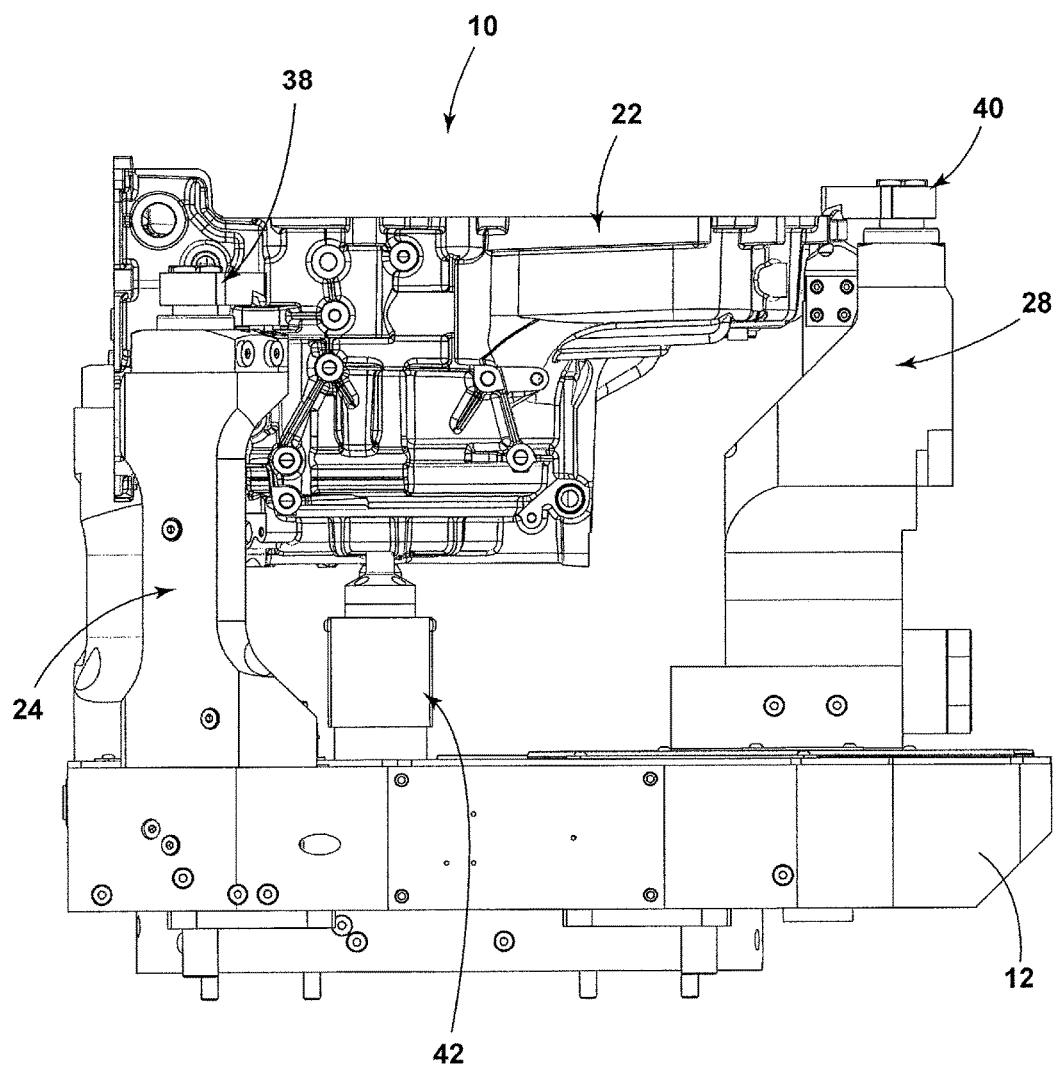
FIG. 10 is a second side elevational view of the workpiece holding fixture of FIG. 7.

It is contemplated that the dynamic riser 28 can be configured to move along the baseplate 12 in a variety of manners. For example, as generally illustrated in FIG. 6, the dynamic riser 28 may be disposed on a laterally adjustable assembly 48 that may include a mechanical lock 50 and a hydraulic or pneumatic system 52 to release the dynamic riser 28 from a desired position. The laterally adjustable assembly 48 may allow the dynamic riser 28 to move along a plurality of paths that may be parallel to the engagement surface 14 of the baseplate 12. For purposes of this disclosure, hydraulic systems include those systems that utilize pressurized liquid, and pneumatic systems are those systems that include pressurized gases. The size of the baseplate 12 allows for movement of the dynamic riser 28 to cross any desired distance. For Example, according to one embodiment, the dynamic riser 28 may actuate a distance of up to 5 inches or more to accommodate for a wide range of components. Accordingly, once the workpiece 22 has been secured with the first and second static risers 18, 24, only the dynamic riser 28 needs to be secured to the workpiece 22. Additionally, it is contemplated that the dynamic riser 28 may move about a linear path into secure engagement with the workpiece 22, or may take an arcuate or radial path into engagement with the workpiece 22 prior to processing.

To ensure that the workpiece 22 has properly seated against the support pads 30, 32, 34 of the first static riser 18, second static riser 24, and dynamic riser 28, respectively, an air part seating system may be utilized. The air part seating system (APS) incorporates a steady stream of air, or a blast of air, to verify that the workpiece 22 is in proper engagement with the support pads 30, 32, 34 of the first static riser 18, second static riser 24, and dynamic riser 28, respectively. An air leak indicates that the workpiece 22 is not properly seated, while no air leak is indicative of proper placement of the workpiece 22 on the support pads 30, 32, 34. If an air leak is found, the securing clamps 36, 38, 40 can be lifted from engagement with the first, second, and third tabs, and the workpiece 22 can be reseated. This process can be repeated if the workpiece 22 fails to seat properly for a second time.

Referring to FIGS. 11-13B, according to one embodiment, the dynamic riser 28 may be moved to a desired location with the assistance of one or more tools (e.g., 44, 46) of the CNC machine 56. In high volume and high precision operations, it is often necessary to frequently change tools; for this reason, many CNC machines 56 are provided with associated components that enable tools 44, 46 to be changed quickly and readily. To this end, many CNC machines 56 are equipped with tool changing facilities, such as turrets and automatic tool changers 60. In some cases, the tool 44, 46 can be driven by a motor when in the working position. The CNC machine 56 may include the dynamic riser 28 moving tools 44, 46, workpiece processing and/or machining tools, and/or any other desired tools.

Figure 11:
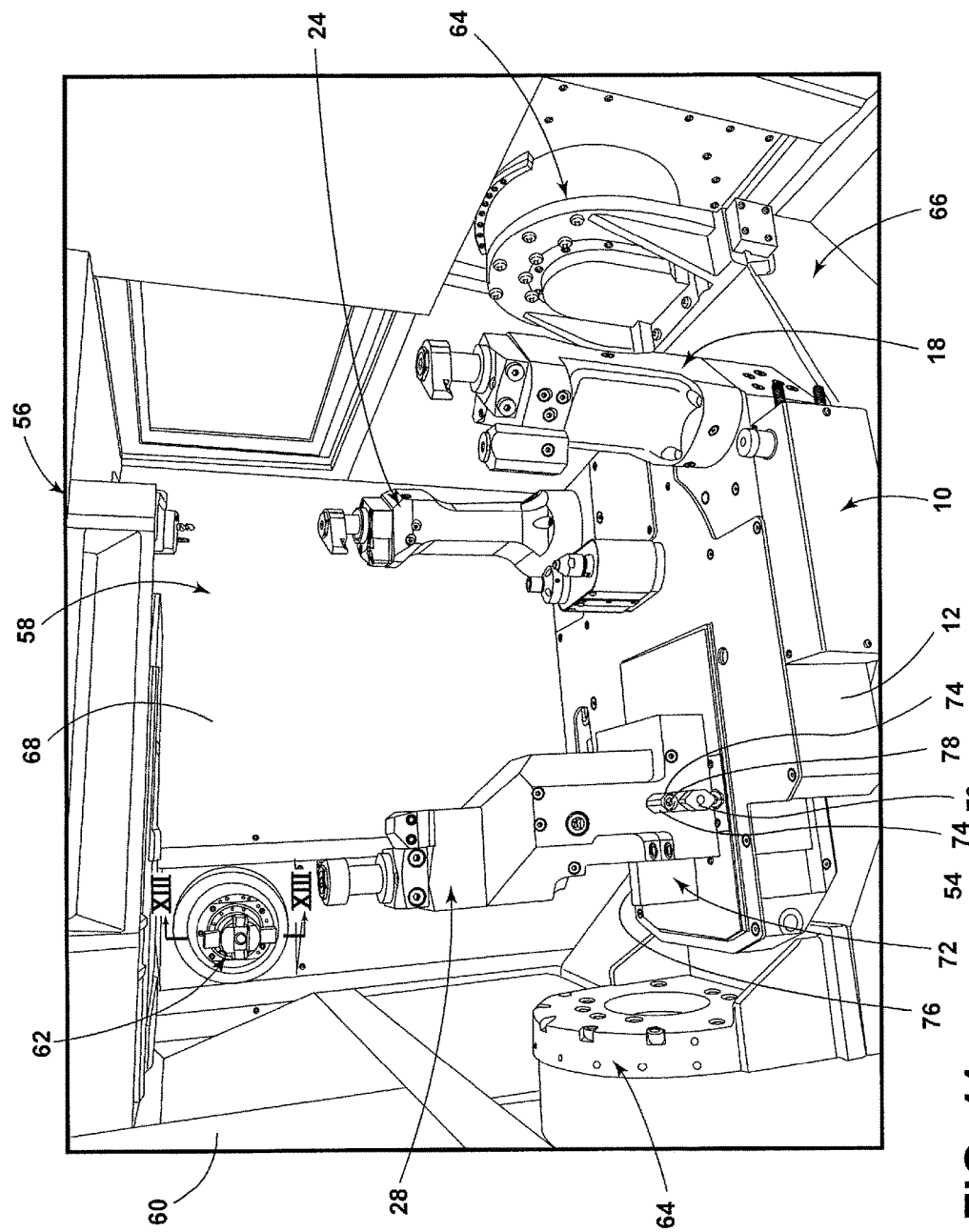
FIG. 11 is a perspective view of the workpiece holding fixture disposed within a computer numerical control (CNC) machine.

As illustrated in FIG. 11, the CNC machine 56, according to one embodiment, includes a machine unit 58 and the tool changer 60. The machine unit 58 may include a machine body 68, a spindle 62 arranged on the machine unit 58 for linear articulation, a saddle 64 coupled with the machine body 68, and a worktable 66 that is able to support the workpiece 22. In addition, the spindle 62 is configured to couple with one or more tools 44, 46, which may include the dynamic riser 28 moving tools 44, 46, workpiece processing and/or machining tools, and/or any other desired tools.

Furthermore, the one or more tools 44, 46 are controlled by the computer control system based on the user instructions. The movement of the spindle 62, the saddle 64, and the worktable 66 may be activated by the user instructions. The worktable 66 may move closely to the spindle 62, so that the one or more tools 44, 46 are provided to contact the workpiece 22. In addition, when different kinds of tools are needed throughout the machining process, the tool changer 60 is enabled to exchange the tool 44, 46 that is coupled to the spindle 62.

Figure 12:
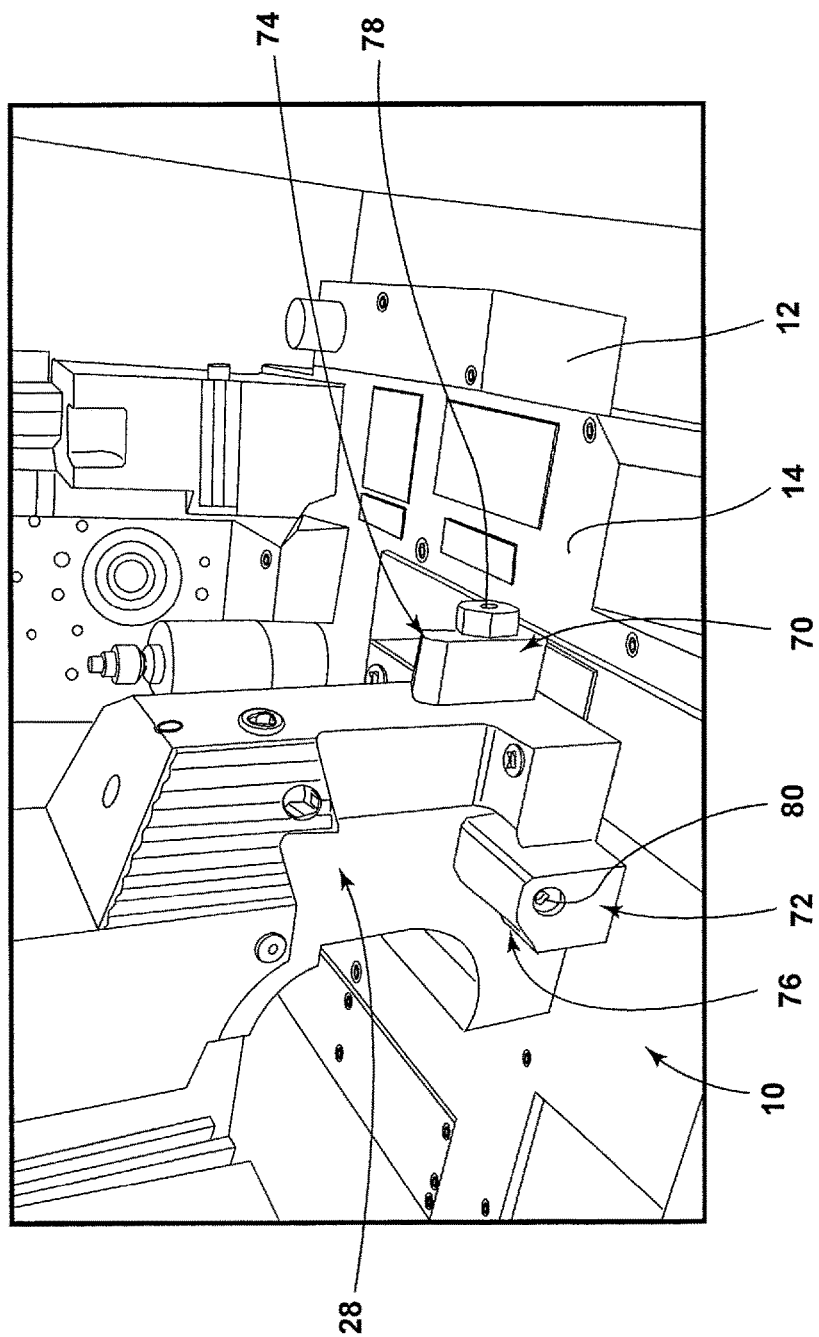
FIG. 12 is a partial side perspective view of the dynamic riser of FIG. 11.

Referring to FIG. 12, the dynamic riser 28 may include first and second engagement members 70, 72 that may be integrally formed with the dynamic riser 28, or alternatively, attached thereto through any process known in the art. In any event, the first and second engagement members 70, 72 may be sufficiently supported by the dynamic riser 28 such that one or more tools 44, 46 of the CNC machine 56 may move the dynamic riser 28 along the engagement surface 14 of the fixture 10 by contacting the first and second engagement members 70, 72 and forcing the dynamic riser 28 along a desired path. According to one embodiment, the first and second engagement members 70, 72 may be pulled and/or pushed along the engagement surface 14 to move the dynamic riser 28 to a desired location along an x-axis and/or a z-axis. As described above, the dynamic riser 28 may also be vertically adjustable (e.g., along a y-axis) such that the dynamic riser 28 may be placed in any desired location based on the three-dimensional movement within a working envelope of the CNC machine 56.

With further reference to FIG. 12, the first and second engagement members 70, 72 each include chamfered top surfaces 74, 76 and one or more mechanical fasteners 78, 80 coupling the first, and second engagement members 70, 72 to the dynamic riser 28. The engagement members 70, 72 are disposed along two converging surfaces of the dynamic riser 28 such that the first engagement member 70 may be utilized for linear movement along a first plane (e.g., x-axis), while the second engagement member 72 may be utilized for movement along a second plane (e.g., z-axis).

Figure 13A:
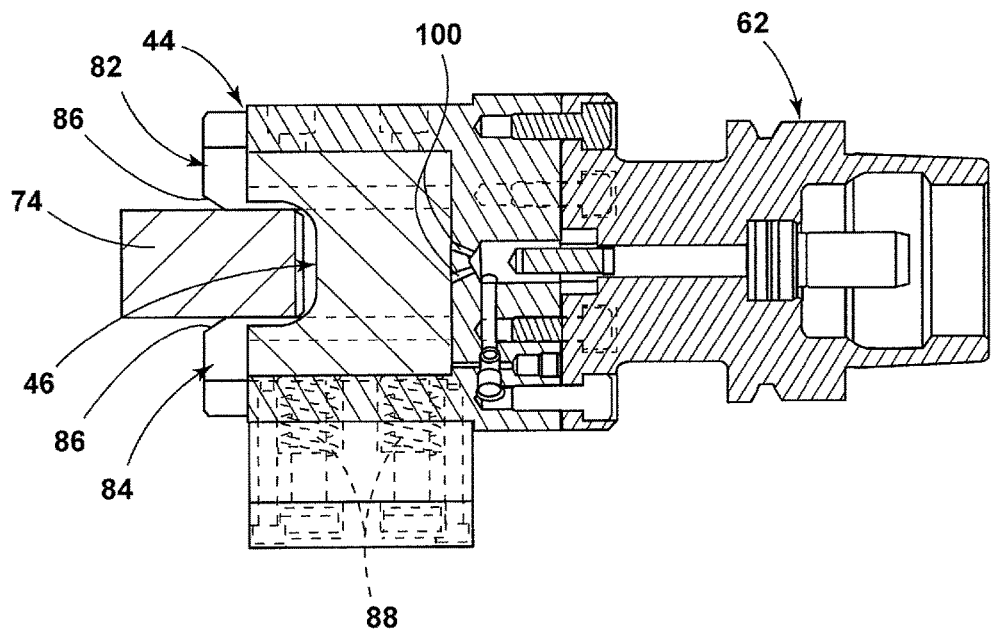
FIG. 13A is an exemplary cross-sectional view taken along the line XIII-XIII of FIG. 11 of a first tool attached to a spindle of the CNC machine that is configured to move the dynamic riser in a first direction and including an air blow-off assembly.
Figure 13B:
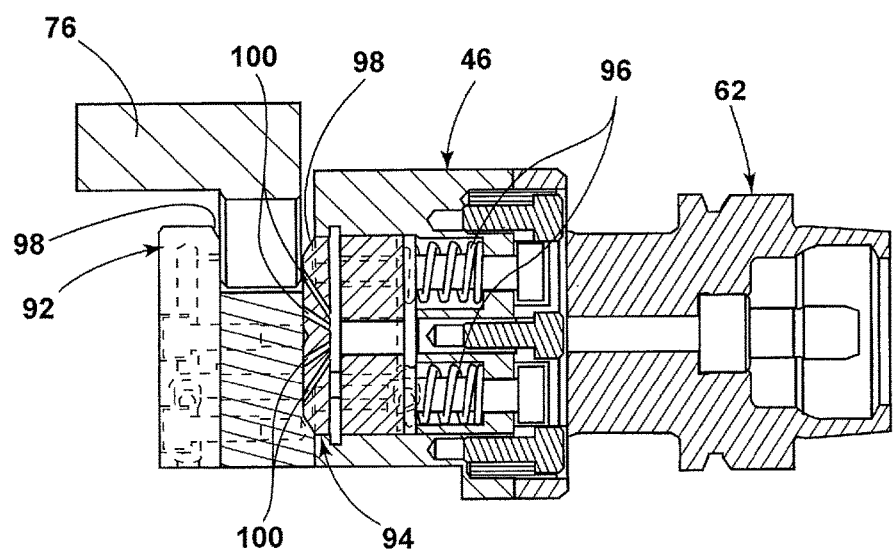
FIG. 13B is an exemplary cross-sectional view taken along the line XIII-XIII of FIG. 11 of a second tool attached to the spindle of the CNC machine that is configured to move the dynamic riser in a second direction and including the air blow-off assembly.

As illustrated in FIGS. 13A-13B, the first tool 44 may be configured to move the dynamic riser 28 along the first plane (e.g., x-axis) by contacting the first engagement member 70 coupled to the dynamic riser 28. A second tool 46 may be configured to move the dynamic riser 28 along a second plane (e.g., z-axis) by contacting the second engagement member 72 disposed thereon. It will be appreciated, however, that the first and second tools 44, 46 may be configured to contact the first and second engagement members 70, 72, respectively, for moving the dynamic riser 28 to any desired location.

As illustrated in FIG. 13A, the first tool 44 includes first and second protrusions 82, 84. The first and second protrusions 82, 84 may be configured to correspond with the surfaces of the first engagement member 70, or any other practicable shape, and may have lead chamfers 86 on an inner periphery thereof for assisting in guidance of the first engagement member 70 into proper engagement within the first tool 44.

The first protrusion 82 may be fixed and may be utilized as a datum reference face between the dynamic riser 28 and the first tool 44. Conversely, the second protrusion 84 may be linearly actuable. One or more springs 88 may press the second protrusion 84 towards the first protrusion 82, such that the first engagement member 70 presses the second protrusion 84 away from the first as the first engagement member 70 enters a cavity 90 defined between the first and second protrusions 82, 84. Once the first engagement member 70 is disposed between the first and second protrusions 82, 84, the first engagement member 70 is in contact with both the first and the second protrusions 84 through compressive force supplied by the one or more springs 88. Once this position is obtained, the dynamic riser 28 may be moved along the desired plane (e.g., x-axis).

As illustrated in FIG. 13B, the second tool 46 may have a similar configuration to the first tool 44. A first protrusion 92 of the second tool 46 may be stationary and may be utilized as a datum reference face between the second engagement member 72 and the second tool 46. A second protrusion 94 may be linearly actuable by one or more springs 96 to verify that the second engagement member 72 is in compressive contact with both surfaces once inserted therebetween. The two protrusions 92, 94 may also have lead chamfers 98 for assistance in guiding the second engagement member 72 into proper alignment between the two protrusions 92, 94. It will be appreciated that the dynamic riser 28 may be moved between one or more desired locations by one or more tools 44, 46 through any other means without departing from the teachings provided herein.

According to one embodiment, the spindle 62 engages with the first and second tools 44, 46 and includes a main body. The body may be of any configuration, such as an HSK tool holder configuration, and is adapted to be driven by the spindle 62.

With further reference to FIGS. 13A and 13B, the first and second tools 44, 46 may each also include an air blow-off assembly 100 to remove any debris from any surface of first and second tools 44, 46. For example, the air blow-off assembly 100 may be configured to remove debris from the first and/or second tool 44, 46 prior to movement of the dynamic riser 28 from one position to another. The air blow-off assembly 100 may include a pneumatic blow-off mechanism positioned proximate the first and second protrusions 82, 84 of the first tool 44, or proximate the first and second protrusions 92, 94 of the second tool 46. The air blow-off assembly 100 may be attached to a pneumatic line disposed within the spindle 62. It will be appreciated that any other system may be utilized for removing debris from any portion or surface of the fixture 10 without departing from the teachings provided herein.

Figure 14:
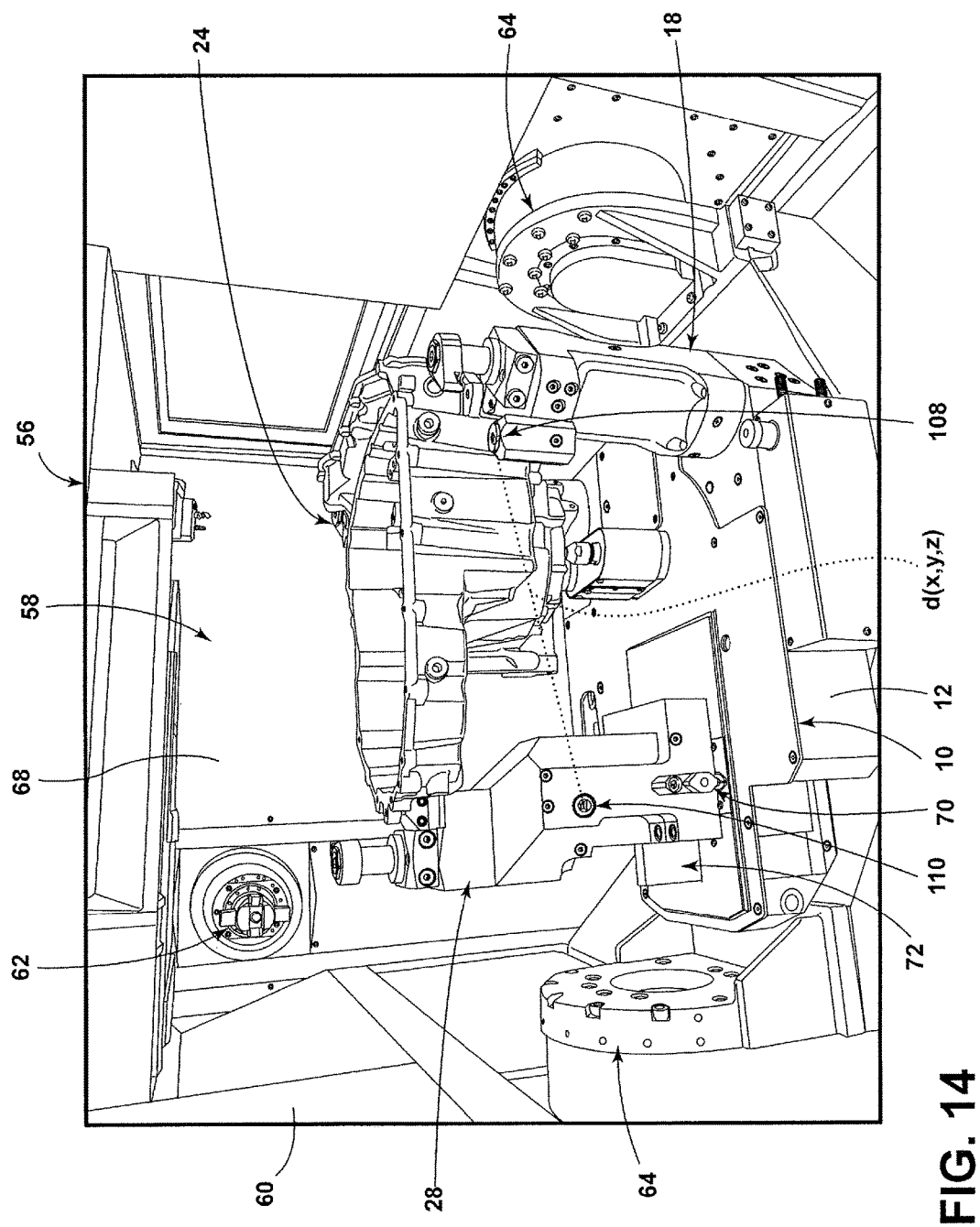
FIG. 14 is a perspective view of the workpiece holding fixture disposed within the CNC machine having first and second gage bores for determining an offset distance therebetween.
Figure 15:
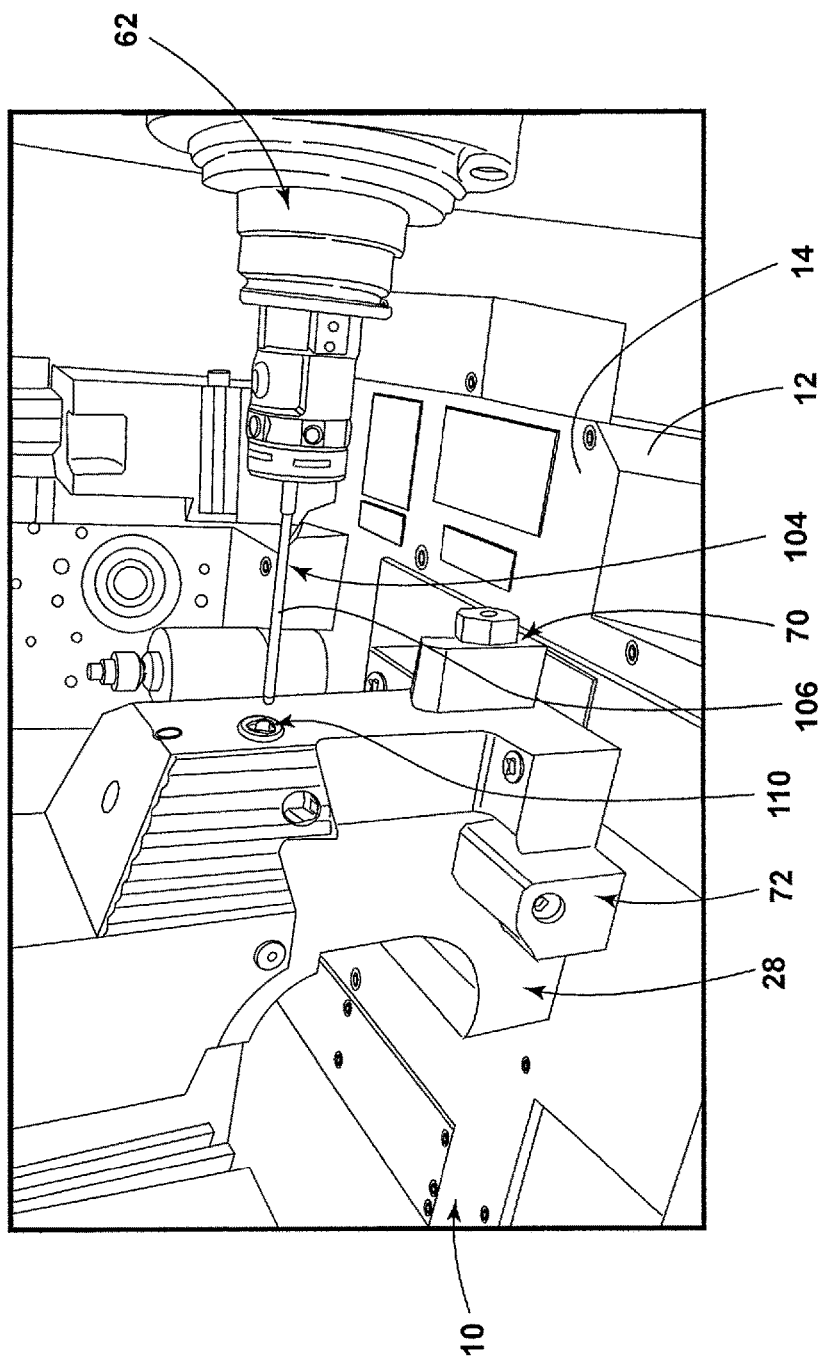
FIG. 15 is a side perspective partial view of the dynamic riser and a probe attached to the spindle.
Figure 16:
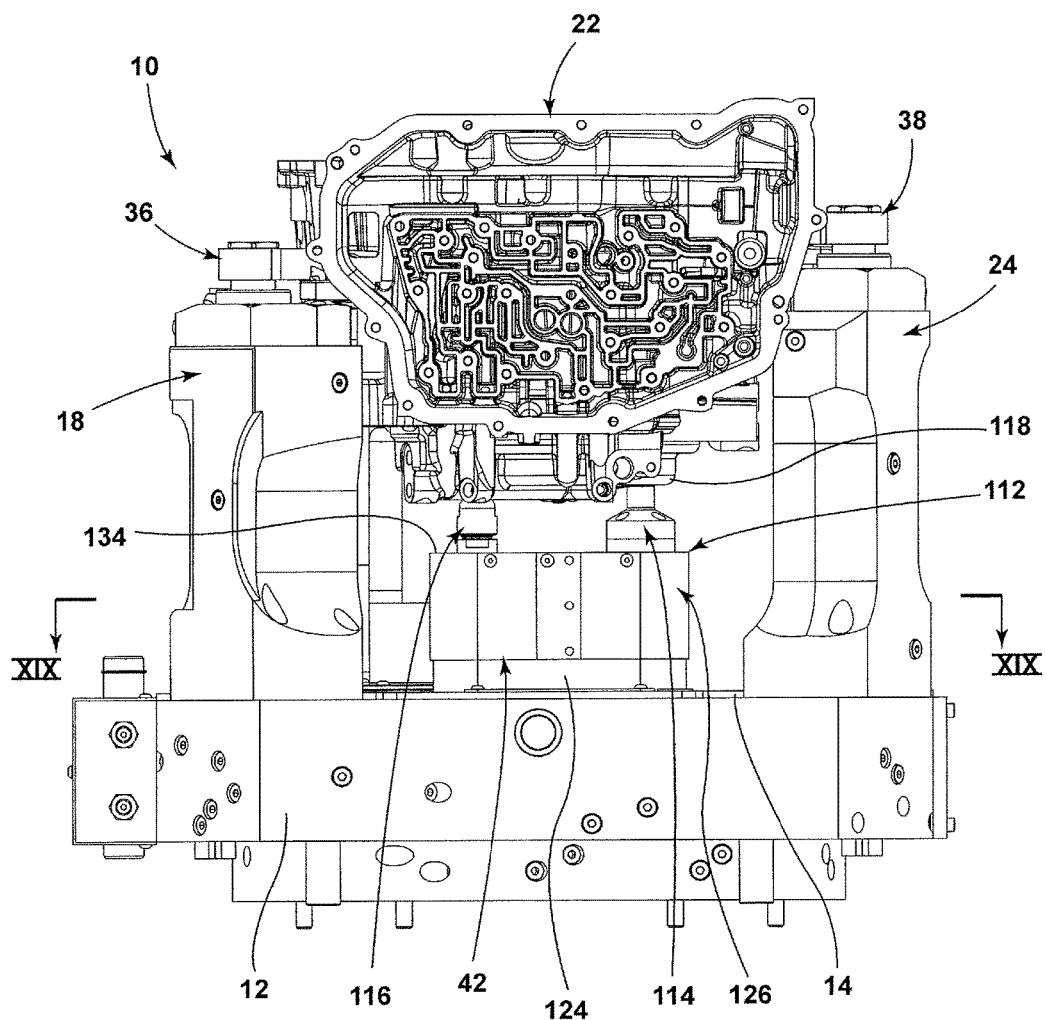
FIG. 16 is a side elevational view of the workpiece holding fixture having the workpiece engaged thereto and a work piece support disposed on the workpiece holding fixture.
Figure 17:
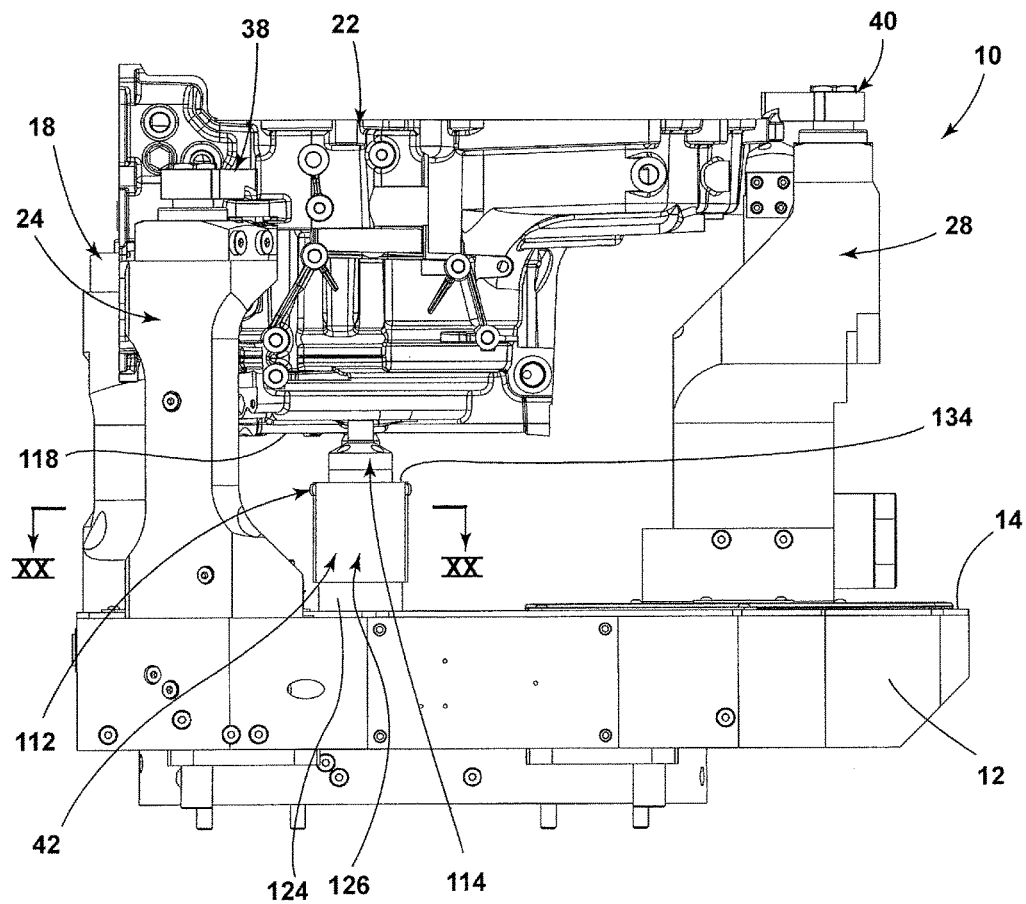
FIG. 17 is an alternate side elevational view of the workpiece holding fixture having the workpiece coupled thereto and the work piece support in contact with an exterior surface of the workpiece.
Figure 18A:
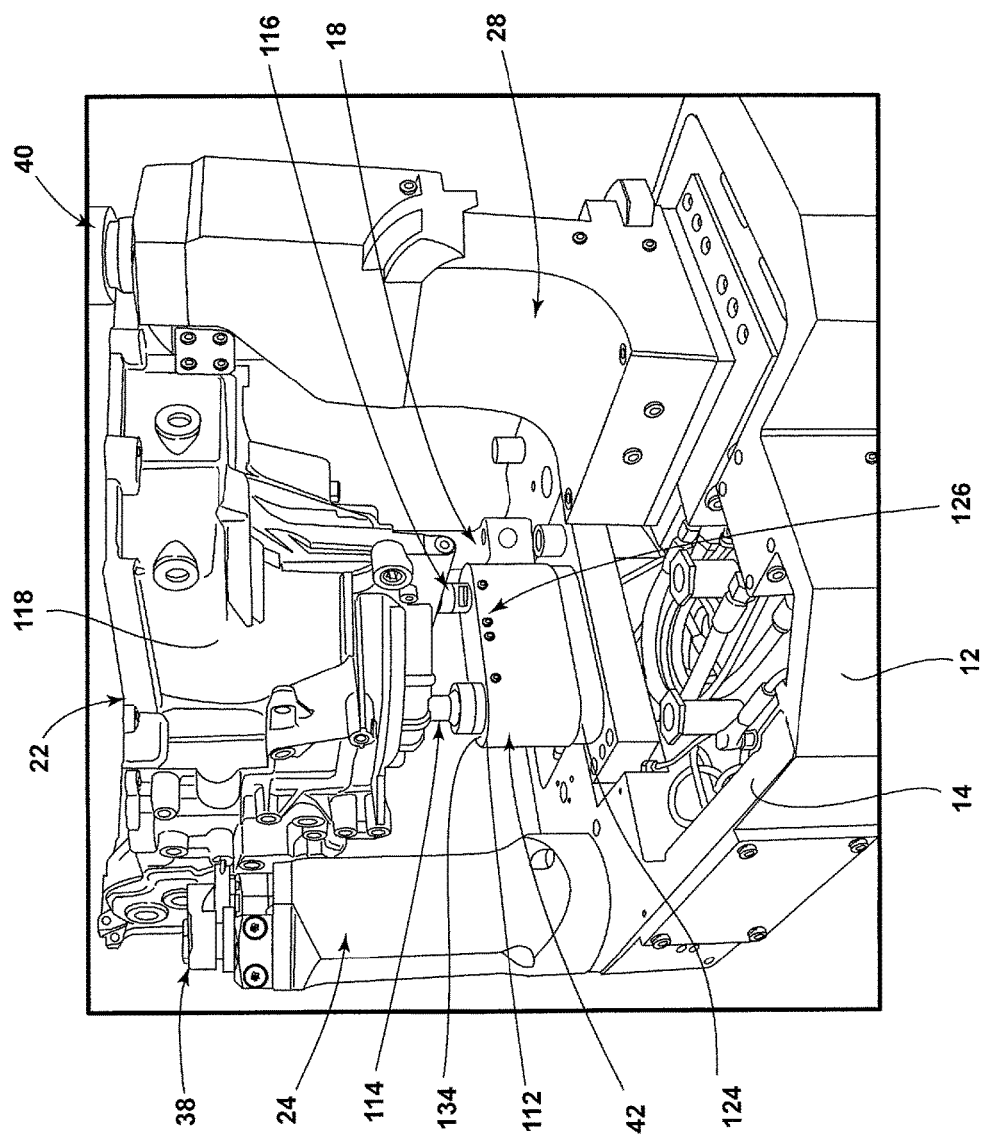
FIG. 18A is a top perspective view of the workpiece holding fixture having the workpiece support thereon.
Figure 18B:
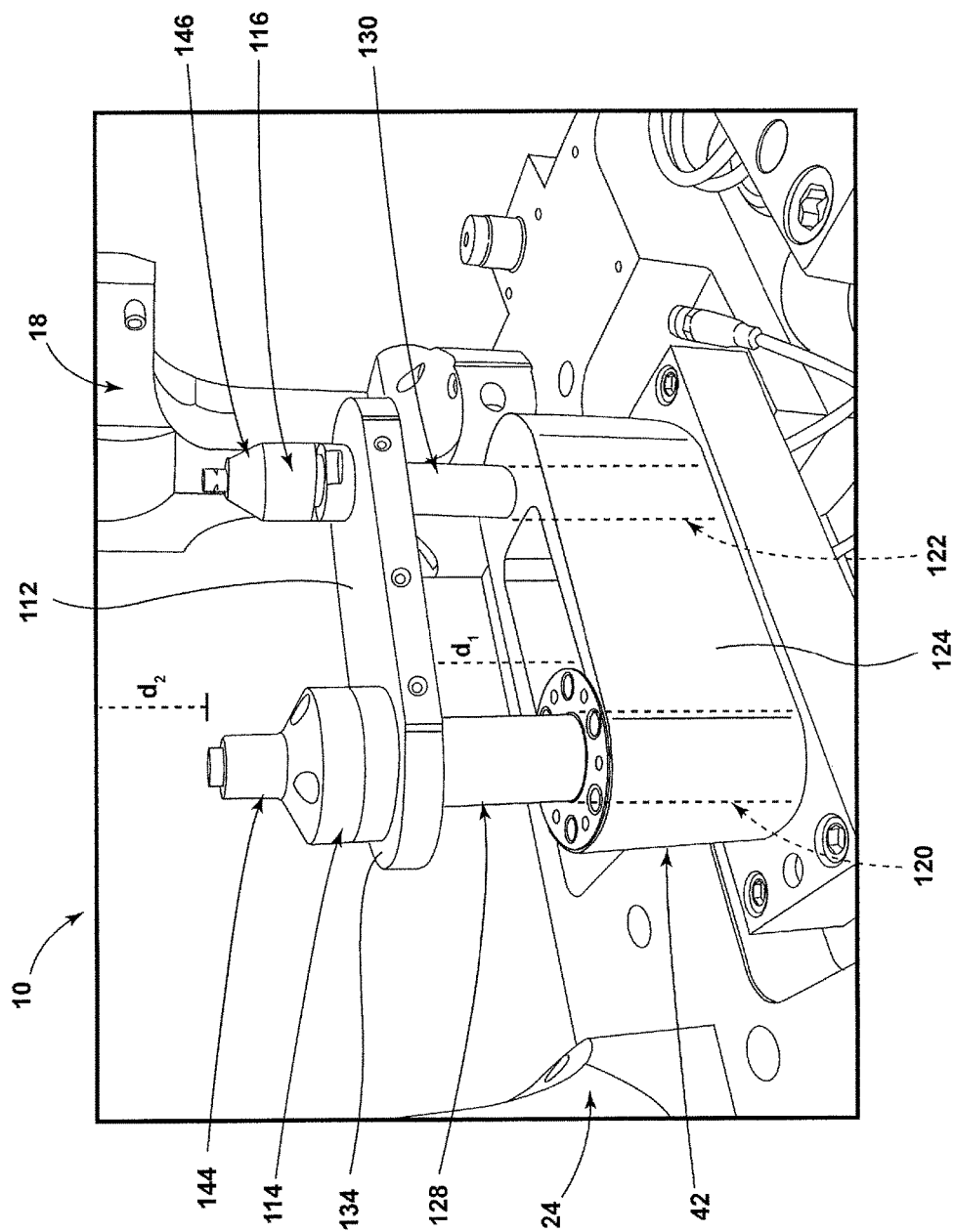
FIG. 18B is an enlarged top perspective view of the workpiece support of FIG. 18A.

Referring to FIGS. 14-15, a probe 104 is operatively connected to the CNC machine 56 and configured to verify and calibrate each new location of the dynamic riser 28. The probe 104 may include a stylus 106 for measuring point locations disposed on the fixture 10. According to one embodiment, the probe 104 may be configured as a Renishaw probe. The probe 104 is operatively connected to a controller and provides one or more inputs from the probe 104 to the controller. The controller may also control the CNC machine 56 including the position of the worktable 66, the specific tool (e.g., 44, 46) attached to the spindle 62, the working pattern, etc.

The probe 104 may be configured to measure distinct points on any of the static or dynamic risers 18, 24, 28 on the fixture 10, or distinct points on any other component of the fixture 10. According to one embodiment, a first gage bore 108 may be disposed on the static riser 18. The first gage bore 108 may be orientated along a first surface of the static riser 18 such that the first gage bore 108 aligns with a first plane (e.g., x-axis).

A second gage bore 110 may be disposed on the dynamic riser 28. The second gage bore 110 may be defined by a surface of the dynamic riser 28 such that the second gage bore 110 aligns with a second plane (e.g., z-axis). According to one embodiment, the first gage bore 108 aligns with the x-axis, while the second gage bore 110 aligns with the z-axis. However, in alternate embodiments, the fixture 10 may include any number of gage bores 108, 110 that are oriented in any manner without departing from the teachings provided herein.

According to one embodiment, the first and second gage bores 108, 110 each include continuous airflow that exits through each gage bore 108, 110 to minimize contamination of the gage bores 108, 110. The airflow may be configured such that any gage bore 108, 110 disposed on the fixture 10 is coupled with a pneumatic airline disposed within the fixture 10. The airflow may be initiated whenever the CNC machine 56 determines that the dynamic riser 28 needs to be adjusted, or the airflow may initiated after the dynamic riser 28 is placed in a new position along the fixture 10.

To verify a proper location of the dynamic riser 28 on the fixture 10, a coordinate system may be stored by the controller of the CNC machine 56. As the first and second tools 44, 46 move the dynamic riser 28 between one or more positions, the location of the second gage bore 110 in relation to the first gage bore 108 is altered. Accordingly, after the dynamic riser 28 is placed in a desired position, the probe 104 is inserted into the second gage bore 110 to verify the location of the dynamic riser 28. The location of the second gage bore 110 is determined by the total offset d(x, y, z) between the dynamic riser 28 and the first static riser 18. The total offset d(x, y, z) may be entered into the controller 26 for the CNC machine 56 to verify that the dynamic riser 28 has been moved to the proper location based on a predefined offset for a particular workpiece 22 to be machined. If the second gage bore 110 is determined to be improperly located based on the inputs received from the probe 104, the first and/or second tool 44, 46 may adjust the location of the dynamic riser 28 and the probe 104 may re-test the location and verify proper offset distance d(x, y, z) between the first and second gage bores 108, 110 such that the fixture 10 may be automatically reconfigured and calibrated.

According to one embodiment, to verify the proper location of the dynamic riser 28, the offset distance d(x, y, z) between the first and second gage bores 108, 110 is measured. A total offset distance d(x, y, z) between the first and second gage bores 108, 110 disposed on the static riser 18 and dynamic riser 28, respectively, may be calculated using the following relationship:

$$d(x,y,z)=\sqrt{(x_{g1}-x_{g2})^2+(y_{g1}-y_{g2})^2+(z_{g1}-z_{g2})^2}$$

where $x_{g1}$, $y_{g1}$, and $z_{g1}$ is the instantaneous position of the first gage bore 108 in a three-dimensional coordinate system and $x_{g2}$, $y_{g2}$, and $z_{g2}$ is the instantaneous position of the second gage bore 110. As illustrated in FIG. 14, the first and second gage bores 108, 110 are disposed on locations that are fixed along the y-axis. However, in alternate embodiments, the first and second gage bores 108, 110 may move in any number of dimensions. Under these circumstances, additional variables may be added to the total offset equation such that a proper distance may be calculated and verified.

Through the calculation of a total offset distance d(x, y, z) between the first static riser 18 and the dynamic riser 28, repeatability in fixture 10 position may be increased when compared to the usage of absolute machine coordinates. Through usage of the process described herein, it may also be possible to eliminate the need for thermal compensation for fixture 10 growth due to fixture 10 temperature variation. Thus, accuracy and repeatability may be improved by moving the dynamic riser 28 relative to the first static riser 18 versus the CNC machine 56 zero point while minimizing dimensional stack up.

Referring to FIGS. 16A-20B, once the dynamic riser 28 is placed in a desired position and the position is verified by the controller, a workpiece 22 may be disposed on the fixture 10. In addition to the workpiece 22 being supported by one or more static and/or dynamic risers 18, 24, 28, an actuable workpiece support 42 may be provided on the fixture 10 that is disposed between the static and/or dynamic risers 18, 24, 28. The workpiece support 42 may include a pair of elongated members 114, 116, which may be cylindrical in cross-section, that support an exterior surface 118 of the workpiece 22 to further prevent movement of the workpiece 22 during a machining process.

Referring to FIGS. 16A-16B, the first and second members 114, 116 may each have respective bottom sections 120, 122 that are encompassed and supported by a support base 124. The support base 124 may be affixed to the baseplate 12 in a static or dynamic manner. The first and/or second members 114, 116 may linearly extend from the base portion in a parallel direction, however, in alternate embodiments, any member 114, 116 may extend in any direction. The first member 114 may have a first cross-sectional diameter, while the second member 116 may have a second, smaller cross-sectional diameter. However, in alternate embodiments, the members may be of an equal diameter, or the second diameter may be larger.

A contact plate 112 may brace and/or contact respective intermediate sections 128, 130 of the first and second members 114, 116. As illustrated, the contact plate 112 surrounds both the first and second members 114, 116, however, in alternate embodiments, the contact plate 112 may contact the first and/or second members 114, 116 in alternate orientations without departing from the teachings provided herein. The contact plate 112 may provide support to the members in a lateral direction (e.g., along the x-axis).

A contact plate cover 126 may extend downwardly from the contact plate 112. The contact plate cover 126 may cover any desired components of the fixture 10.

With further reference to FIG. 16B, the bottom section 120 and/or intermediate section 128 of the first member 114 may actuate away and towards the engagement surface 14. Moreover, the contact plate 112 may be coupled to the first member 114 such that the contact plate 112 moves with the bottom and/or intermediate section 120, 128 of the first member 114. The contact plate 112 may also encompass an intermediate section 130 of the second member 116, and may or may not be affixed thereto. In some embodiments, the contact plate 112 may be affixed to either, or both, of the members. According to one embodiment, the contact plate 112 may slide along the intermediate section 130 of the second member 116.

Figure 19:
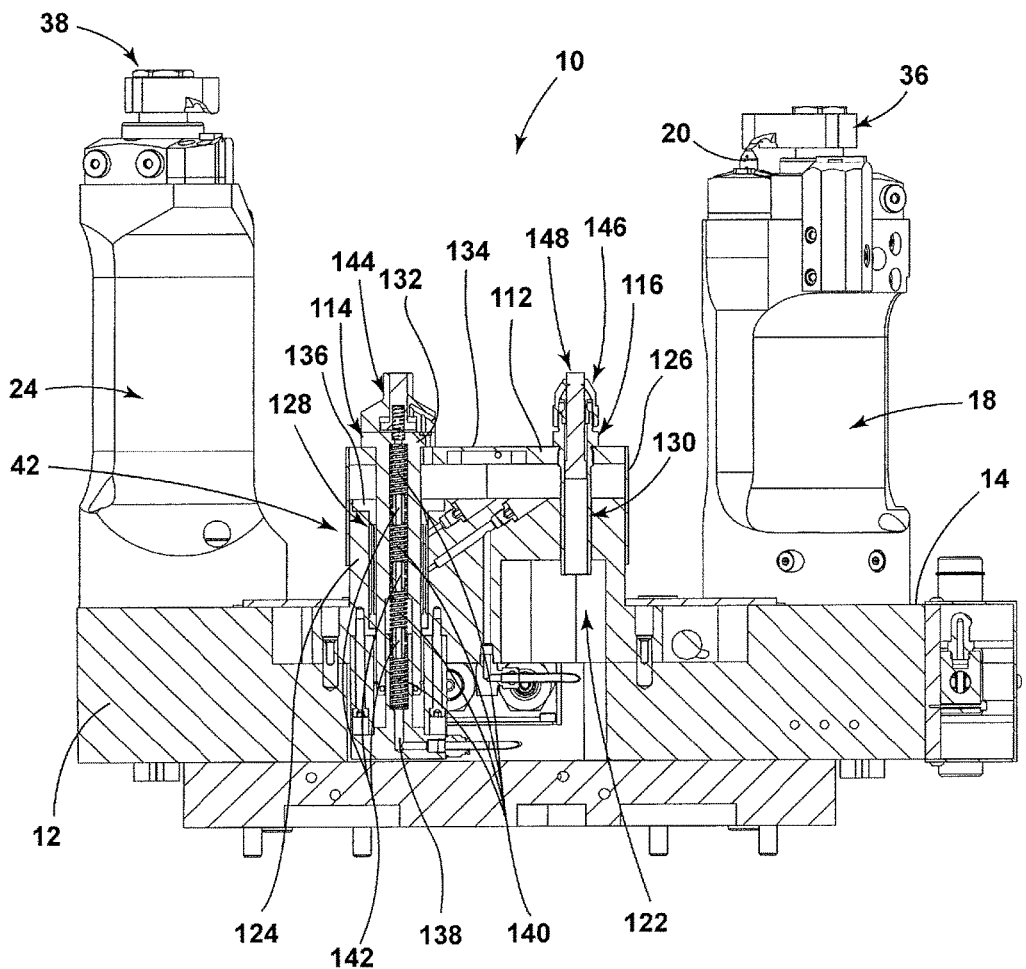
FIG. 19 is an exemplary cross-sectional view taken along the line XIX-XIX of FIG. 16 illustrating the workpiece support having first and second members therein.
Figure 20:
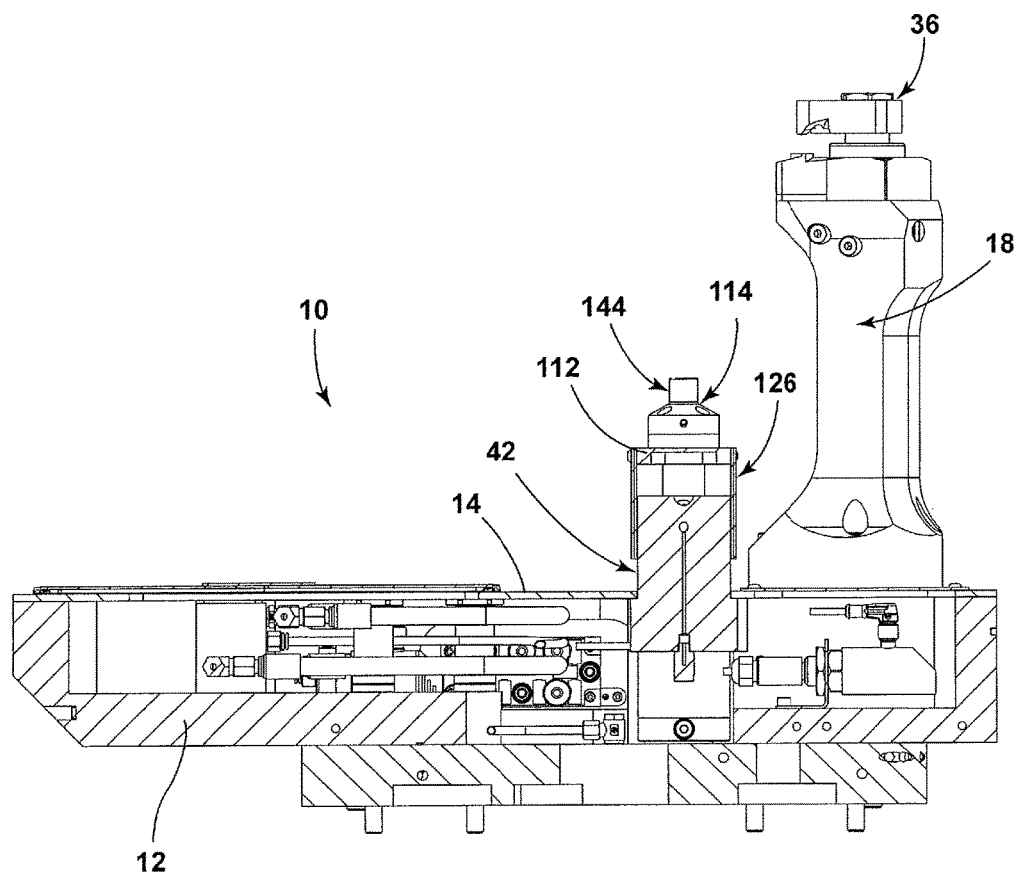
FIG. 20 is an exemplary cross-sectional view taken along the line XX-XX of FIG. 17 illustrating the first member of the workpiece support.
Figure 21:
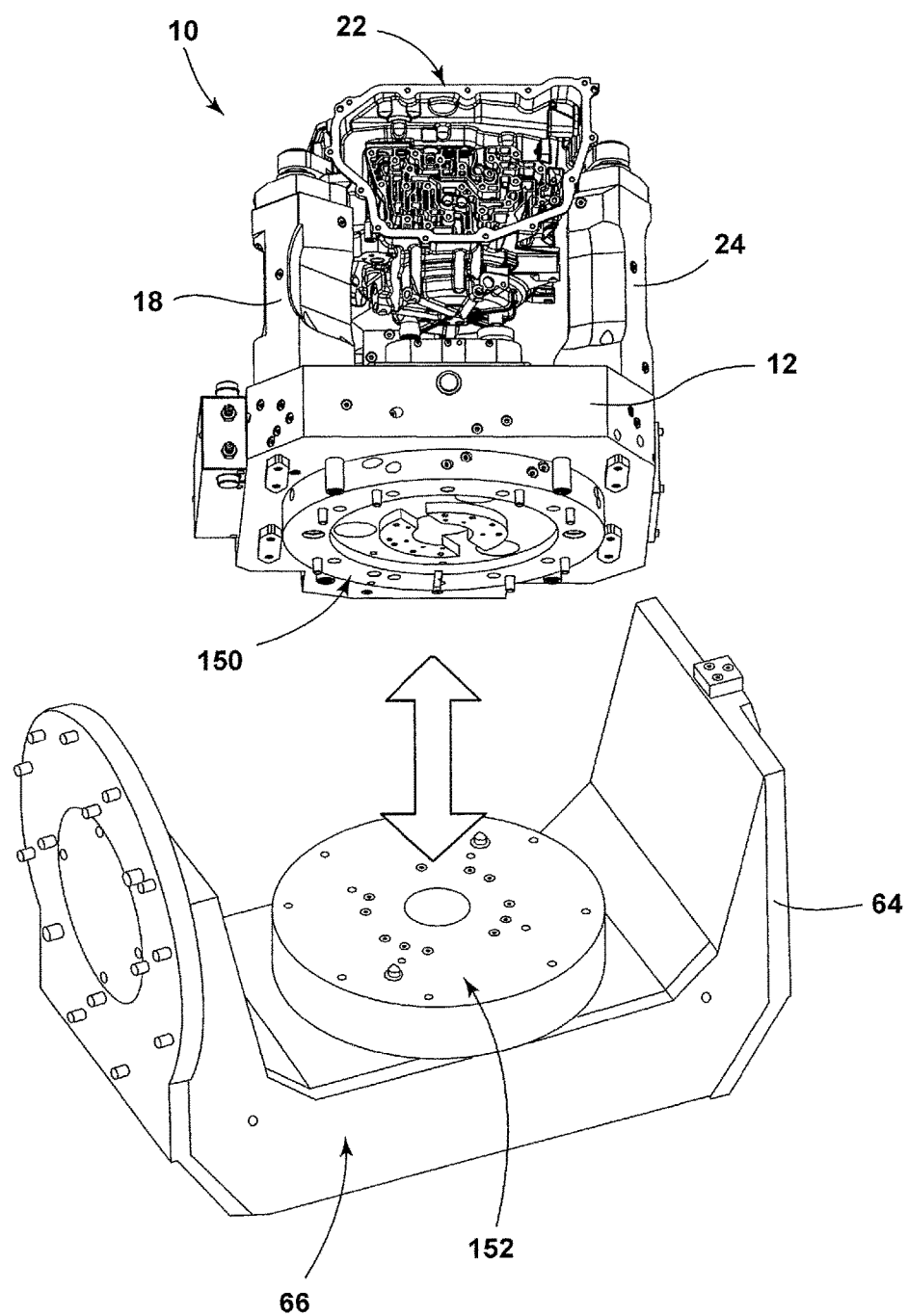
FIG. 21 is a bottom perspective plan view of one embodiment of the workpiece holding fixture having a standardized base portion that may be coupled with a worktable of the CNC machine.
Figure 22:
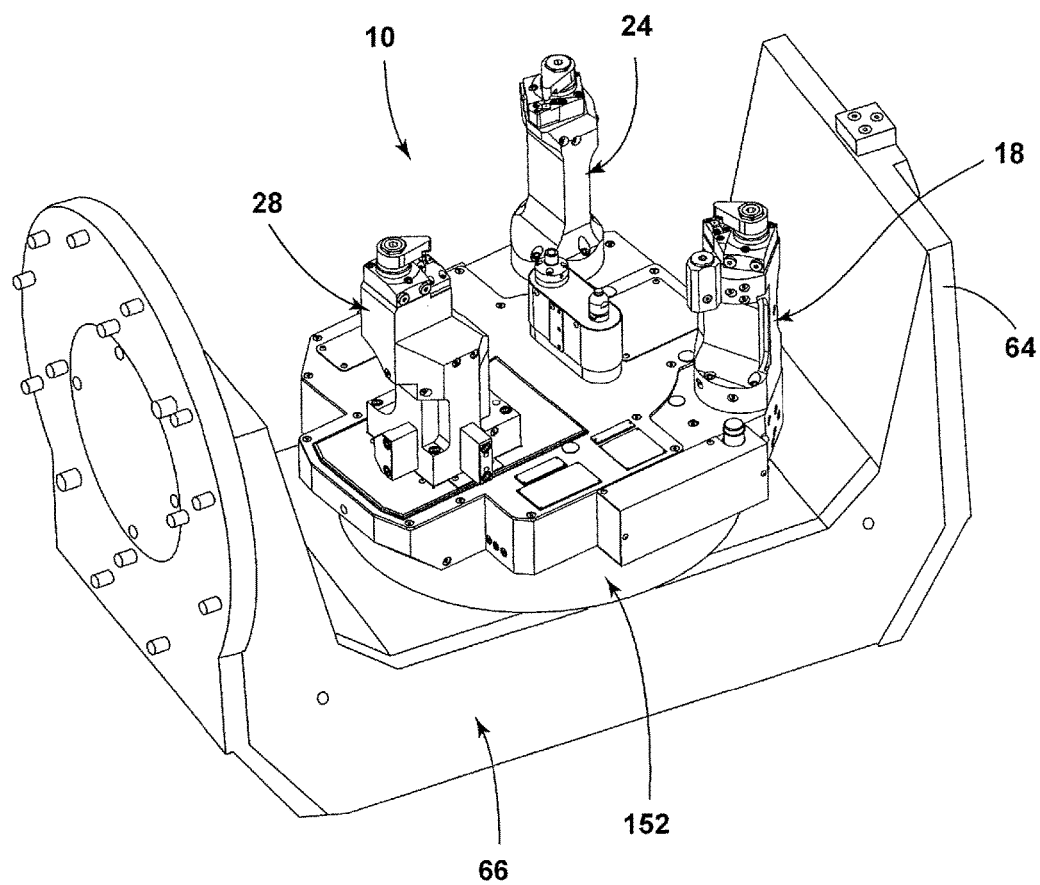
FIG. 22 is a top perspective plan view of the workpiece holding fixture of FIG. 21 having the standardized base portion coupled with the worktable of the CNC machine.
Figure 23:
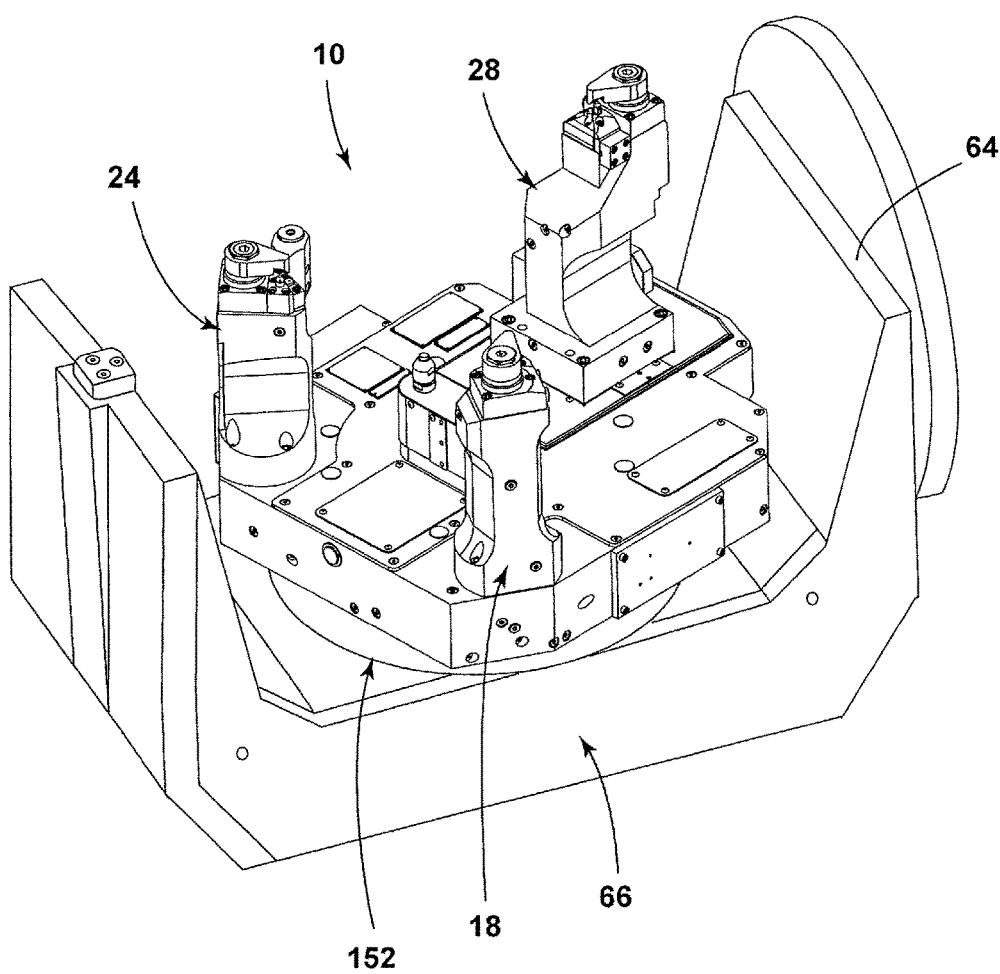
FIG. 23 is an alternate top perspective plan view of the workpiece holding fixture of FIG. 21 having the standardized base portion coupled with the worktable of the CNC machine.
Figure 24:
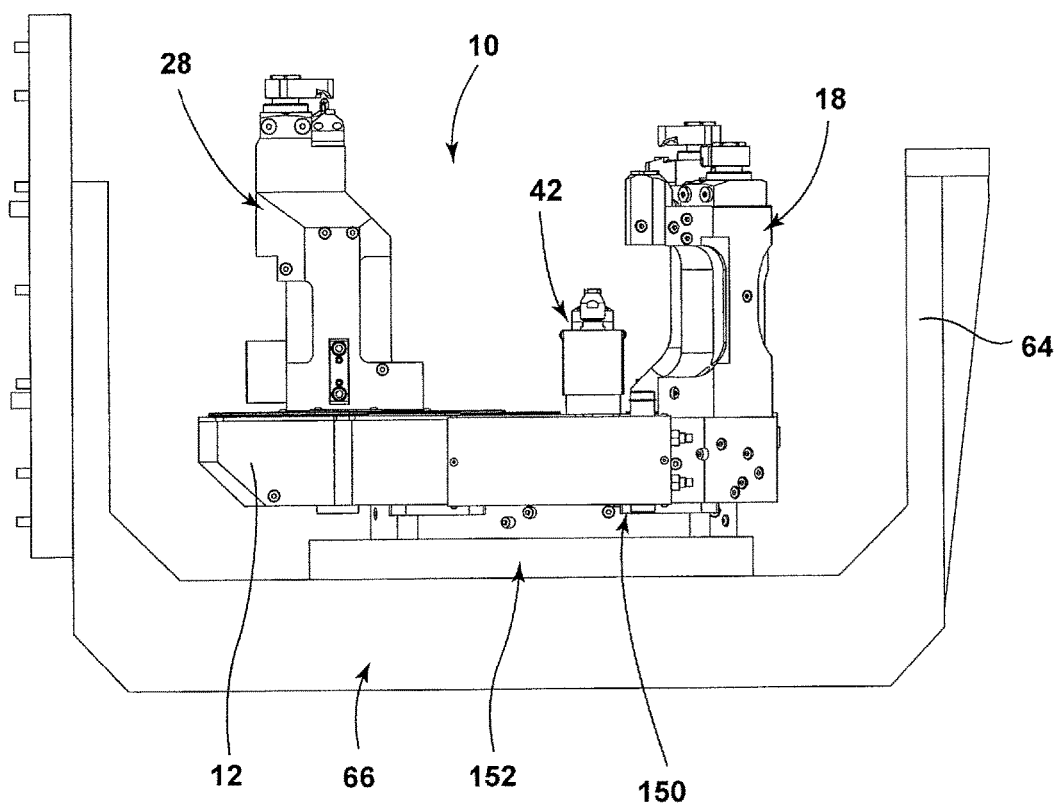
FIG. 24 is a side elevational view of the workpiece holding fixture of FIG. 21 having the standardized base portion coupled with the worktable of the CNC machine.
Figure 25:
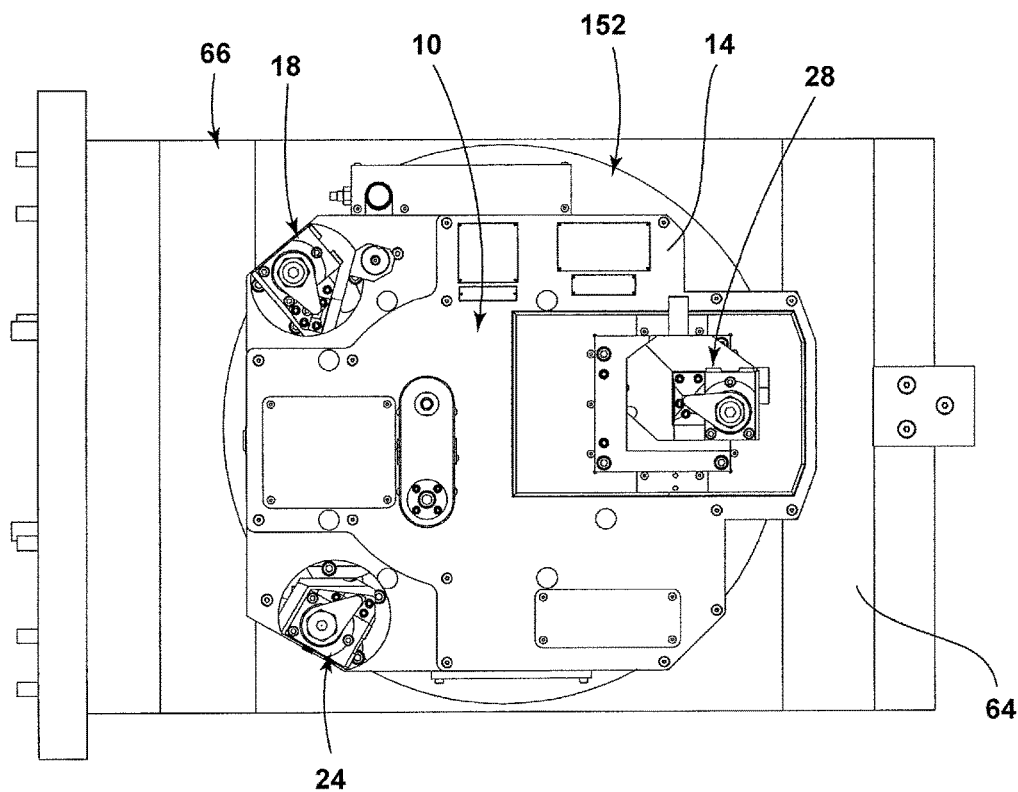
FIG. 25 is a top plan view of the workpiece holding fixture of FIG. 21 having the standardized base portion coupled with the worktable of the CNC machine.
Figure 26:
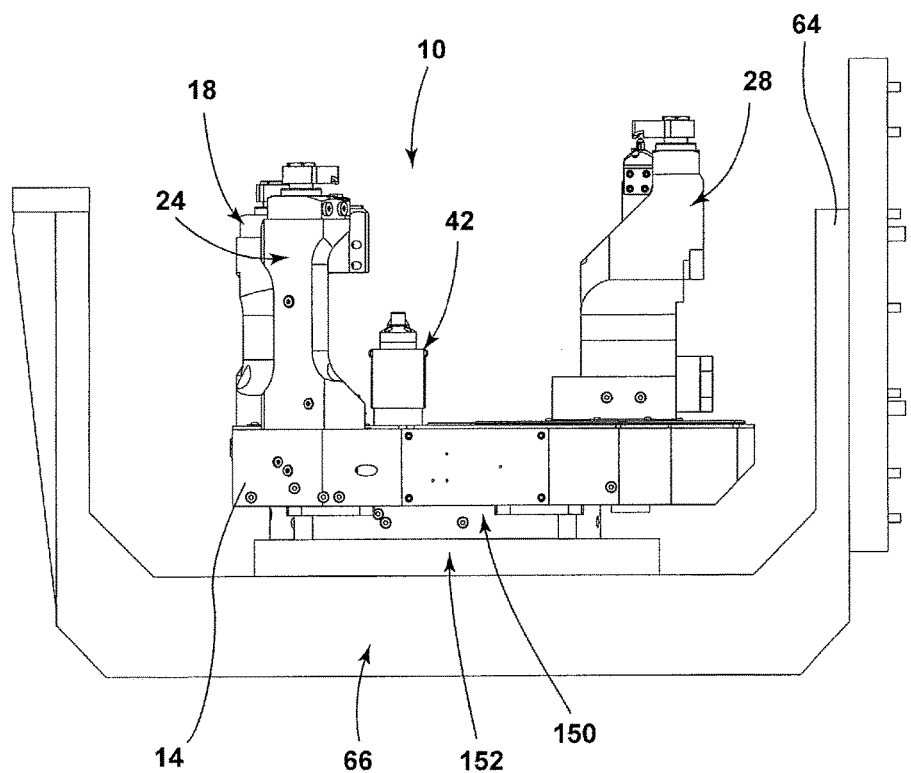
FIG. 26 is an alternate side elevational view of the workpiece holding fixture of FIG. 21 having the standardized base portion coupled with the worktable of the CNC machine.
Figure 27:
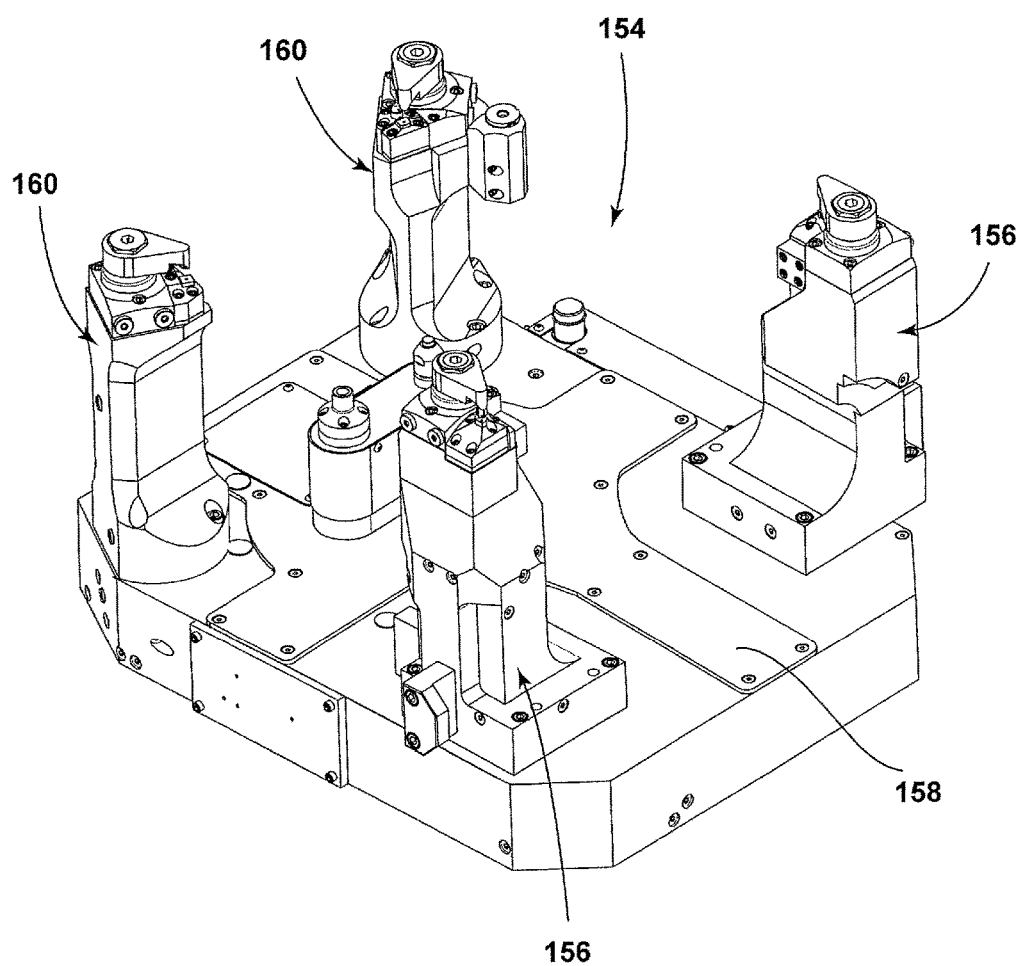
FIG. 27 is a first top side perspective view of another embodiment of a workpiece holding fixture.
Figure 28:
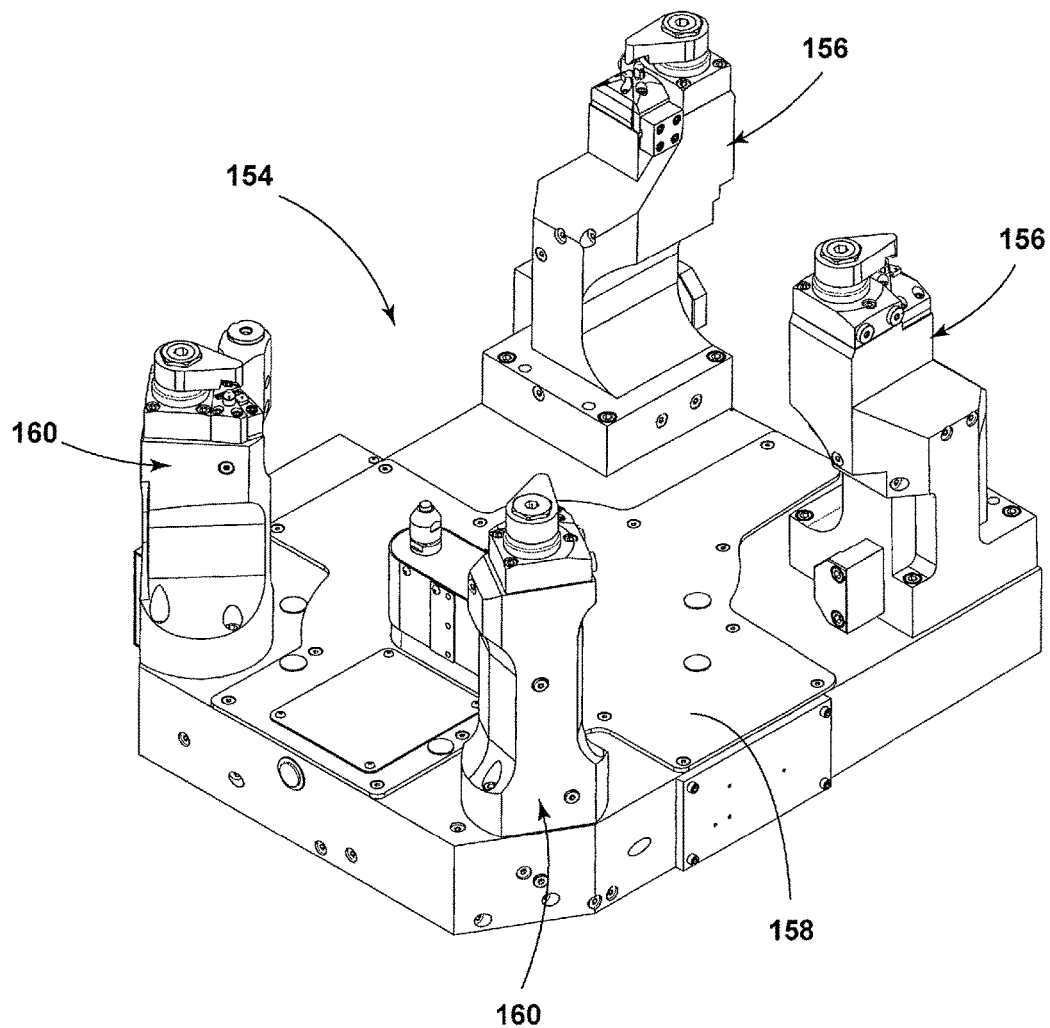
FIG. 28 is a top perspective plan view of the workpiece holding fixture of FIG. 27.
Figure 29:
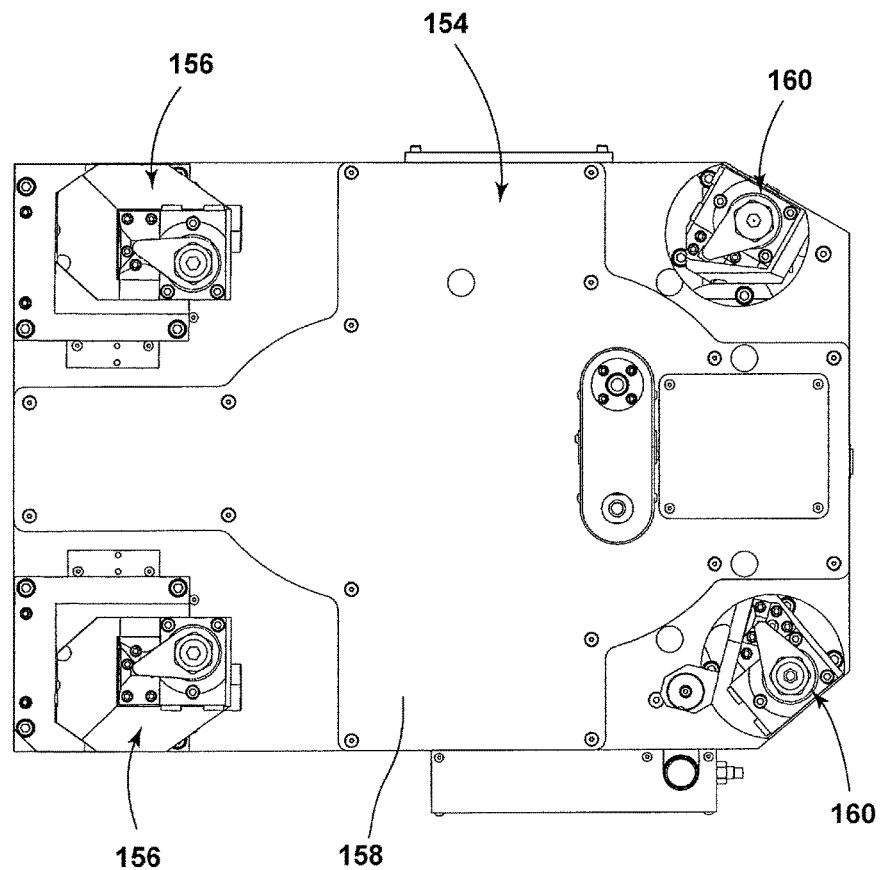
FIG. 29 is a top plan view of the workpiece holding fixture of FIG. 27.
Figure 30:
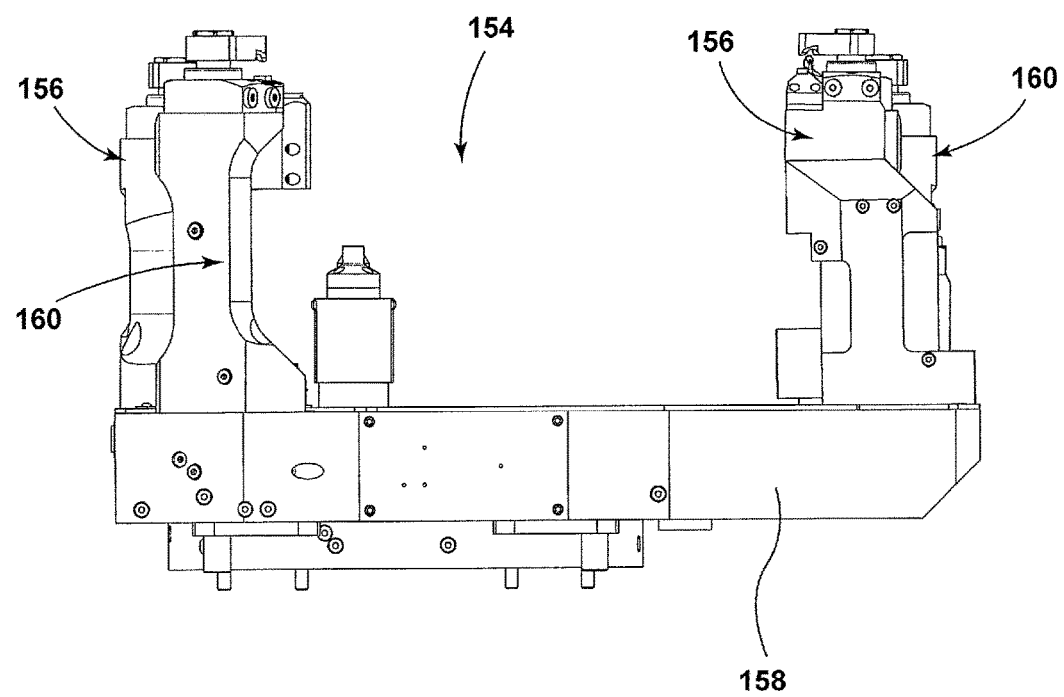
FIG. 30 is a side elevational view of the workpiece holding fixture of FIG. 27.

As illustrated in FIG. 19, the bottom and/or intermediate section 120, 128 of the first member 114 includes an inner casing 132 that extends upwardly through the engagement surface 14 of the fixture 10 and through the contact plate 112. The inner casing 132 may also extend laterally along a top surface 134 of the contact plate 112. The first member 114 also may include an outer casing 136 that is disposed between the fixture 10 and a bottom surface of the contact plate 112. According to one embodiment, one or more actuable assemblies, such as a pneumatic assembly, may be attached to the contact plate 112 that is configured to simultaneously move the contact plate 112 and the first member 114 due to the attachment between the inner casing 132 and/or the outer casing 136 and the contact plate 112.

The first member 114 may further include a central spindle 138 that has one or more springs 140 separated by one or more spacers 142 thereon. The one or more springs 140 disposed around the spindle 138 may cause an upper section 144 of the first member 114 to move towards and away from the engagement surface 14 of the fixture 10. Accordingly, the first member 114 may maintain contact with any size workpiece 22. The springs 140, as illustrated, are expansions springs. However, any type of compressible assembly may be used in conjunction with, or in replacement of, the expansion springs 140 illustrated without departing from the teachings provided herein. Accordingly, the first member 114 may move a first linear distance through a first portion of the first member 114 and a second linear distance in the second portion of the first member 114.

The bottom and/or intermediate sections 122, 130 of the second member 116 may include static components of a fixed distance including integrally formed bottom and intermediate sections 122, 130 that may extend though the engagement surface 14. Accordingly, the contact plate 112 may be movable in conjunction with the first member 114 while the second member 116 assists in guiding the contact plate 112 along the parallel axes. An upper section 146 of the second member 116 may be stationary and include a sensor 148 thereon for monitoring a characteristic of the workpiece 22.

The second member 116 may include a stationary upper section 146 that extends upwardly of the contact plate 112. The stationary upper section 146 of the second member 116 may include a sensor 148 at a top portion thereof such that the sensor 148 is disposed between the second member 116 and workpiece 22 when a workpiece 22 is disposed within the fixture 10. According to one embodiment, the sensor 148 is configured as a temperature sensor that monitors the temperature change of the workpiece 22 as the workpiece 22 is machined. The temperature sensor may additionally, or alternatively, measure the temperature of the fixture 10, or any portion thereof, to offset any thermal expansion of the fixture 10, and components thereof, during a manufacturing process. Due to the cutting forces required to form specific parts, the temperature of the workpiece 22 may significantly vary leading to thermal expansion of the fixture 10 and/or workpiece 22. The dynamic fixture 10 described herein may monitor the thermal expansion of the workpiece 22 and/or components of the fixture 10 and adjust the fixture 10 accordingly to maintain the desired tolerances of the workpiece 22. It will be appreciated, however, that any other sensor may be disposed on the first and/or second cylinder without departing from the teachings provided herein.

Referring to FIG. 20B, a pneumatic assembly may be connected to the first member 114, second member 116, and/or contact plate 112 and linearly actuable to move a first portion of the first or second member 114, 116. The first and/or second member 114, 116 may be actuable along a second distance through the usage of one or more springs, or through any other mechanical system known in the art.

Referring to FIGS. 21-26 the fixture 10 may include a standardized base portion 150 that connects with corresponding connections 152 on the worktable 66. Accordingly, the controller of the CNC machine 56 may include code segments relating to one or more fixture templates.

The fixture templates may be standardized templates or models provided to facilitate standardization in and streamlining of the design process. The templates can be preset with operation parameters, site parameters, manufacturing parameters, work cell definitions, tooling definitions, and any other setting that may have to be performed with each new CNC program. These parameters allow the user to globally set default manufacturing parameters, which expedites and standardizes the process of generating CNC program sequences. Standardization of the fixture base portion 150 facilitates a high level of automation by allowing the user to easily input information such as, for example, a CNC program name, a material (e.g., aluminum, cast iron, stainless steel, tool steel), a maximum machining depth, and a machine load (e.g., light, medium, heavy). Thus, rather than beginning each new fixture design from scratch, the user will begin with an existing template and change default parameters or otherwise adapt it as needed.

The pre-defined libraries contain a plurality of computer or virtual models of a variety of dynamic and/or first and second static risers 18, 24, as well as their associated dimensions and mounting geometries. Because the dimensions and mounting geometries are represented in the models, the computer program is advantageously able to check for tolerances, clearances, and interferences between the fixture 10 and the worktable 66, dynamic and/or first and second static risers 18, 24, and the workpiece 22.

Additionally, as mentioned, all models of dynamic and/or first and second static risers 18, 24 will contain appropriate parameters and relations to allow the computer program to check for proper clearances and interferences. Additionally, where applicable, each model will contain features, which represent, for example, the point of clamping contact, and which can be used to more easily position the dynamic riser 28. Additionally, the computer program uses design variation tables whenever possible, which, it will be appreciated, allows the user to easily replace dynamic and/or first and second static risers 18, 24 to review a number of design scenarios.

The workpiece holding fixture 10 is generally set up to receive, locate, and clamp workpieces 22 of a variety of shapes and sizes. Examples of workpieces 22 include transmission cases, transmission converter housings, hydraulic control bodies, transmission case extensions, power take off units, rear drive units, transfer cases, planetary carriers, cylinder blocks, cylinder heads, bearing girdles, front covers, intake manifolds, exhaust manifolds, carriers, and cases. The first and second static risers 18, 24 generally maintain a position relative to the baseplate 12 during use while the third riser, the dynamic riser 28, moves along one plane. The workpiece holding fixture 10 is generally rapidly convertible. Moreover, one workpiece holding fixture 10 can be used to hold a variety of workpieces 22. As described herein, the workpiece 22, engaged by the workpiece holding fixture 10, can be automatically rearranged. According to one embodiment, in some instances, the fixture may be automatically rearranged in a very short period of time—which may be less than 30 seconds, thereby dramatically reducing or potentially eliminating the downtime associated with model changeovers.

The first and second static risers 18, 24, as well as the dynamic riser 28 and the securing clamps 36, 38, 40, are all highly accurate and precisely move to constrain workpieces 22 statically in the workpiece holding fixture 10 against all processing forces. The securing clamps 36, 38, 40 generally move between a lowered engaged position in contact with the workpiece 22 and a raised disengaged position out of contact with the workpiece 22. In the illustrated embodiment, the securing clamps 36, 38, 40 are generally configured to rotate approximately 90 degrees. However, it is contemplated that the clamps 36, 38, 40 could rotate any predetermined amount that allows for engagement with the workpiece 22 and clear disengagement from the workpiece 22. It is contemplated that the workpiece 22 can be moved to accommodate processing on every side of the workpiece 22. The workpiece holding fixture 10 is configured to eliminate the possibility of distortion or damage to the workpiece 22. Additionally, APS and clamp force monitoring is utilized to determine proper location of the workpiece 22 and the level of constraint of the workpiece 22.

Referring now to FIGS. 27-30, in another embodiment, a four-riser workpiece holding fixture 154 is illustrated. In this embodiment, the fixture 154 includes one or more of dynamic risers 156, while the remaining risers maintain a static riser 160 configuration. More specifically, one or more static risers 160 maintain a fixed position relative to a baseplate 158, while the remaining dynamic risers 156 move relative to the baseplate 158 as various workpieces 22 are moved into and out of engagement with the four-riser workpiece holding fixture 154, which can be secured to a trunnion or a worktable 66. The dynamic risers 156 could incorporate any of the systems noted above. As generally outlined above, it is contemplated that based on an automated process, or instructions provided by the user, the workpiece holding fixture 10 will reset to secure any given workpiece 22. It will be appreciated that the fixture described herein may have any number of static riser(s) 160 and any number of dynamic riser(s) 154 without departing from the teachings provided herein.

The incorporation of CNC machines 56 has provided great flexibility in the operations and tool 44, 46 paths that can be utilized on various workpieces. However, the traditional work holding fixtures are characteristically designed for and dedicated to one part type and require changeover to accommodate a different part. In order for a machine tool to accommodate multiple part types with different locating or clamp points, current art generally requires that the entire machine tool fixture either be physically exchanged in the machine or the part locating details of the fixture be manually rearranged. While the process of exchanging or rearranging is completed the machine tool must be taken out of service resulting in significant productivity losses. These offline periods can take more than an hour and sometimes up to eight hours to complete.

As noted herein, the present workpiece holding fixture provides at least one moving clamp/locating pad/riser assembly that is moved by the tool of the CNC machine 56 locked in place via a mechanical lock, and released via a hydraulic cylinder, pneumatic cylinder, or electro-mechanical servomotor to variable positions along a path defined by slot or linear guideway on, in, or mounted to the fixture baseplate 12. The movable riser/clamp/pad assembly allows rapid in place reconfiguration of the fixture eliminating the down time due to fixture exchanges or rearrangement currently required to complete model changes. The usage of one or more tools 44, 46 within the CNC machine 56 allows a standard CNC machine 56 to be utilized without substantial variations thereto.

It will be also understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A workpiece fixture assembly comprising:
   first and second static risers removably coupling a first workpiece thereto, the first static riser including a first gage bore thereon;
   a dynamic riser abutting the workpiece having a second gage bore thereon;
   a probe to measure an offset distance between the first and second gage bores; and
   a workpiece support including an actuable first member having one or more springs.

2. The workpiece fixture assembly of claim 1, wherein the dynamic riser is movable along a first axis and a second, intersecting axis.

3. The workpiece fixture assembly of claim 1, wherein the dynamic riser is placed in a predefined position along a travel slot based on the offset distance between the first and second gage bores.

4. The workpiece fixture assembly of claim 1, wherein the offset distance is adjusted between machining two workpieces to compensate for thermal expansion.

5. The workpiece fixture assembly of claim 1, wherein a position of the dynamic riser is verified by calculating the offset distance between the first and second gage bores after a machining process for the first workpiece and before a machining process of a second workpiece and the dynamic riser is repositioned when the offset distance is varied from a predefined distance.

6. The workpiece fixture assembly of claim 1, wherein the dynamic riser is movable along a linear path.

7. The workpiece fixture assembly of claim 1, wherein the dynamic riser is movable along an arcuate path.

8. A workpiece fixture assembly comprising:
   first and second static risers engaging a workpiece, the first static riser including a first gage bore;
   a dynamic riser abutting the workpiece having a second gage bore;
   a numerical control machine having a probe to measure an offset distance between the first and second gage bores;

a linearly actuable workpiece support including first and second members supported by a baseplate; and a sensor on the second member.

9. The workpiece fixture assembly of claim 8, wherein the first member is coupled to a contact plate.

10. The workpiece fixture assembly of claim 9, wherein the contact plate moves in conjunction with a first portion of the first member.

11. The workpiece fixture assembly of claim 10, wherein a second portion of the first member is extendable above the contact plate.

12. The workpiece fixture assembly of claim 8, wherein the sensor is disposed on a top portion of the second member.

13. The workpiece fixture assembly of claim 8, wherein the first member includes a central spindle having one or more springs disposed thereon.

14. The workpiece fixture assembly of claim 13, wherein the central spindle further includes one or more spacers disposed between the one or more springs.

15. The workpiece fixture assembly of claim 8, wherein the probe of the numerical control machine and a temperature sensor on a workpiece support simultaneously monitor thermal changes of a workpiece, the first static riser, and the dynamic riser.

16. A workpiece fixture assembly comprising:

first and second static risers coupled to a baseplate;

a dynamic riser movable along the baseplate, the dynamic riser positioned in a desired location based on an offset distance between the first static riser and the dynamic riser;

a linearly actuable workpiece support including an actuable first member and a stationary second member; and a contact plate coupled to the first member and slidable along the second member.

17. The workpiece fixture assembly of claim 16, wherein the first member includes a first portion having one or more springs for actuating the first member through a plurality of positions.

18. The workpiece fixture assembly of claim 16, further comprising:

a temperature sensor disposed proximately to a top portion of the second member.

* * * * *